United States Patent [19]

Kuwana et al.

[11] Patent Number: 4,984,163
[45] Date of Patent: Jan. 8, 1991

[54] ROAD SURFACE CONDITION DETECTING AND ANTI-SKID CONTROLLING DEVICE IN CAR

[75] Inventors: Kazutaka Kuwana, Toyota; Tsuyoshi Yoshida, Obu; Kenji Tozu, Kariya, all of Japan

[73] Assignee: Aisin Seiki Kabushiki Kaisha, Kariya, Japan

[21] Appl. No.: 386,781

[22] Filed: Jul. 31, 1989

[30] Foreign Application Priority Data

Jul. 29, 1988 [JP] Japan ................................ 63-190899

[51] Int. Cl.$^5$ ................................................ B60T 8/58
[52] U.S. Cl. ............................ 364/426.02; 364/551.01; 73/105; 303/103
[58] Field of Search ....................... 364/424.05, 426.02, 364/550, 551.01; 280/707; 303/95, 103; 73/105

[56] References Cited

U.S. PATENT DOCUMENTS

| 4,651,290 | 3/1987 | Masaki et al. | 364/424.05 |
| 4,674,767 | 8/1987 | Kuroki et al. | 280/707 |
| 4,770,438 | 9/1988 | Sugasawa et al. | 280/707 |
| 4,796,911 | 1/1989 | Kuroki et al. | 280/707 |
| 4,809,197 | 2/1989 | Tashiro et al. | 73/105 |
| 4,827,416 | 5/1989 | Kawagoe et al. | 280/707 |
| 4,837,727 | 6/1989 | Tashiro et al. | 280/707 |

Primary Examiner—Gary Chin
Attorney, Agent, or Firm—Burns, Doane, Swecker & Mathis

[57] ABSTRACT

A road surface condition detecting and anti-skid controlling device in a car capable of detecting the road surface condition with high accuracy in a multiple-step manner, so that brake pressure control and attenuating capacity adjustment of shock absorbers as well as car level adjustment are more effectively executed. The invention is includes: car wheel speed and car speed detecting devices, a speed changing rate detecting device, memory, valve, calculating, integrating, and comparing devices, and a brake pressure control device. According to the invention, the road surface condition is detected with high accuracy and anti-skid control is more effectively executed by pertinent brake pressure control in response to the road condition so that a high degree of safety and reliability for the brake control in car can be obtained.

3 Claims, 25 Drawing Sheets

GOOD ROAD
(ASPHALT ROAD)

A RATHER
  BAD ROAD
(NON-PAVED ROAD)

BAD ROAD
(PEBBLE ROAD)

EXTREMELY
  BAD ROAD
(STONE ROAD)

ROAD SURFACE CONDITION DETECTING AND ANTI-SKID CONTROLLING DEVICE IN CAR

BACKGROUND OF THE INVENTION

1. Field of the Invention

The present invention relates to a control device in a car for controlling the equipment in the car in response to the road condition as well as a device for detecting the road condition in driving the car.

2. Description of the Prior Art

Road condition affects the driving perception of the operator of a car, easiness of driving (driving character), and safety of car operation.

Shock absorbers are provided on the car, and though the shock absorber decreases transmission to the car body of vibration of the car wheel, since the attenuating capacity of shock absorbers affects the pitching and rolling of the car or its driving character, there has been an art for automatically detecting the driving condition of the car and establishing the attenuating capacity accordingly by providing an attenuating capacity control mechanism for the shock absorber, responsive to the operation of a manual instruction switch or automatic control; and since it is desirable to perform lowering of the car body for the purpose of increasing the safety of the car in high speed driving, there has been an art for establishing the car level appropriately by providing a car level control device for the car, responsive to the operation of a manual instruction switch, or automatic control (for example: Japanese Patent Application Laid-Open Publication Sho-59-17599)

Further, when applying a sudden braking action in case of the road surface being dirtied by oil or being frozen, the car wheel stops rotating due to the braking force while the car wheel skids against the road, and control of the car in the forward direction using the steering wheel becomes difficult, and braking distance becomes extended In order to prevent this, it is desirable to assemble an anti-skid control device for automatically reducing the car wheel brake pressure by detecting a slipping rate of the car wheel to the car in case the possibility of skidding is high (for example: Japanese Patent Application Laid-Open Publication Sho-62-270795).

In the above-described attenuating capacity control of shock absorbers, car level control and anti-skid control according to road condition, it is desirable to change the control characteristic. For example, in the case when road vibration increases, it is preferable to make the attenuating capacity of the shock absorber greater and raise the car level. And, in a car equipped with an anti-skid control device, since a relation with respect to the frictional coefficient $\mu$ of car wheel against the road surface and the slipping rate of the car wheel is changed according to the road condition, for example, as shown in FIGS. 7d–7g, it is preferable to control the car wheel brake pressure so as to create the slipping rate bringing the maximum value of the frictional coefficient $\mu$.

In order to carry out the desired control in response to the road condition as above, it is required to detect the road condition.

In Japanese Patent Publication Sho-58-58254, a vibration detector is provided on a car, and when a peak vibration of the car body exceeds a predetermined value, during a predetermined period of time from that time, the sensitivity of anti-skid control is maintained at a lower level. And, in Japanese Patent Laid-Open Publication Sho-60-22548, there is proposed counting the number of times that the peak car wheel acceleration exceeds the predetermined value, and when the counted value exceeds the predetermined value, lowering the sensitivity of anti-skid control. Further, in Japanese Patent Laid-Open Publication Sho-60-107440 and Patent Laid-Open Publication Sho-60-255558, there is proposed detecting a vibrating frequency of car wheel speed or car wheel acceleration, and when it exceeds a predetermined frequency, lowering the sensitivity of anti-skid control.

In aforementioned conventional road condition detection, generally speaking, a binary value is detected by treating the road as either good or bad, and specifically, in said Japanese Patent Laid-Open Publication Sho-60-22548, when a vibration detector detects the vibration exceeding a predetermined level at any time, a detecting signal representing bad road is generated, and maintained during a predetermined period of time from that time. Therefore, detecting accuracy is extremely coarse, and the probability of error in detection is high. Since the sensitivity change of anti-skid control based on such detection delays the pressure reduction of car wheel brake pressure, the problem is that it becomes hard to obtain the effect of anti-skid control.

Since said Japanese Patent Laid-Open Publication Sho-60-22548 discloses when peaks over a predetermined level arise more than a predetermined number of times within a predetermined period of time, thus detecting a bad road, and since Japanese Patent Laid-Open Publication Sho-60-107440 and Japanese Patent Laid-Open Publication Sho-60-255558 disclose detecting the road condition on the basis of vibrating frequency, it is suspected that detecting accuracy of the road condition here is rather high, but the result of detection is a binary value of good/bad, and therefore, it is appreciated that there are problems in adjustment of anti-skid control corresponding to the road condition is coarse, and also the problem that it becomes hard to obtain the effect of anti-skid control.

OBJECTS AND SUMMARY OF THE INVENTION

Therefore, it is an object of the present invention to provide a road condition detecting and controlling device in a car for increasing the detecting accuracy of road condition.

The road condition detecting device according to the present invention comprises: a car wheel speed detecting means for detecting the rotational speed of a car wheel of the car; a changing rate detecting means for detecting the speed changing rate of the car wheel rotational speed that the car wheel speed detecting means has detected; an integrating means for integrating the absolute value of the speed changing rate that the changing rate detecting means has detected; and a comparing means for comparing the integrated value of the integrating means with a setting value for road condition judgment.

According to the operation of the invention, said car wheel speed detecting means detects the car wheel rotational speed, and the changing rate detecting means detects the acceleration of the car wheel rotational speed.

However, when the car wheel is either sunk into a concave portion of the road, lifted back out of the concave portion, or ridden up to a convex portion, and dropped down from the convex portion, or slips for a moment on the pebbles or gravel or interstices of stone pavement, the rotational speed of the car wheel is instantaneously raised up or dropped down, and this will be repeated irregularly on the bad road, and when a degree of badness of the road is high, the amplitude of such speed changes is larger, and instantaneous increases and decreases in the car wheel rotational speed become larger.

In addition, generally, though there is a sense in which "acceleration" is used to mean both increasing speed and decreasing speed, and a sense implying only increasing speed, in this specification, "acceleration" has the meaning of both increasing speed (positive value) and decreasing speed (negative value), and it means the changing rate of speed.

When the rotational speed of the car wheel is raised from regular speed and subsequently dropped to said regular speed again, a positive peak and a negative peak appear in the acceleration at that moment. That is to say, since the acceleration produces one period of vibration during a half period of vibration of rotational speed, the acceleration becomes double the frequency of vibration, and besides, the more severe is the vibration of car wheel speed, i.e., the worse road conditions, the larger the amplitude of the acceleration.

Therefore, the speed changing rate that said changing rate detecting means detects becomes larger in amplitude as the road becomes worse. And, since said integrating circuit integrates this speed changing rate, the integrated value become a larger value as the road condition becomes worse. And besides, said integrating circuit integrates the absolute value of the speed changing rate, the integrated value becoming relatively larger with vibration of the speed changing rate (in the end, vibration of the car wheel speed), and thereby the judgment of good road/bad road becomes correct, and further this integrated value becomes easy to discriminate in multiple steps. That is to say, the road condition can be judged, for example, as a good road when it is within a lower range of the integrated value, as a rather bad road when it is within a rather high range, as a bad road when it is within a high range, and as a worst road when it is within a highest range.

As described above, when the judgment of good road/bad road becomes correct, and for example, this road surface condition detecting device is applied to anti-skid control, sensitivity adjustment in response to the road surface condition in anti-skid control becomes correct so that disorder of the anti-skid control can be prevented.

Furthermore, when detection is executed by multiple-step discrimination as aforementioned, for example, in the case that this road surface condition detecting device is utilized for sensitivity adjustment of the anti-skid control, the sensitivity of the anti-skid control in response to the integrated value can be adjusted in multiple steps. Since the sensitivity can be gradually changed in case of multiple-step adjustment without there occurring extreme sensitivity changes as in the case of alternative selection of either high sensitivity or low sensitivity, extreme change in control characteristics does not occur and safety and reliability of the anti-skid control are increased.

When the road surface condition detecting device of this invention is utilized, for the attenuating capacity adjustment and/or the car level adjustment of the afore- mentioned shock absorber, improvement of the safety and reliability of the aforementioned control can be similarly achieved.

Other objects and features of this invention will become apparent from the following description of the embodiment with reference to the accompanying drawings.

DESCRIPTION OF THE PREFERRED EMBODIMENT

Figure 1:
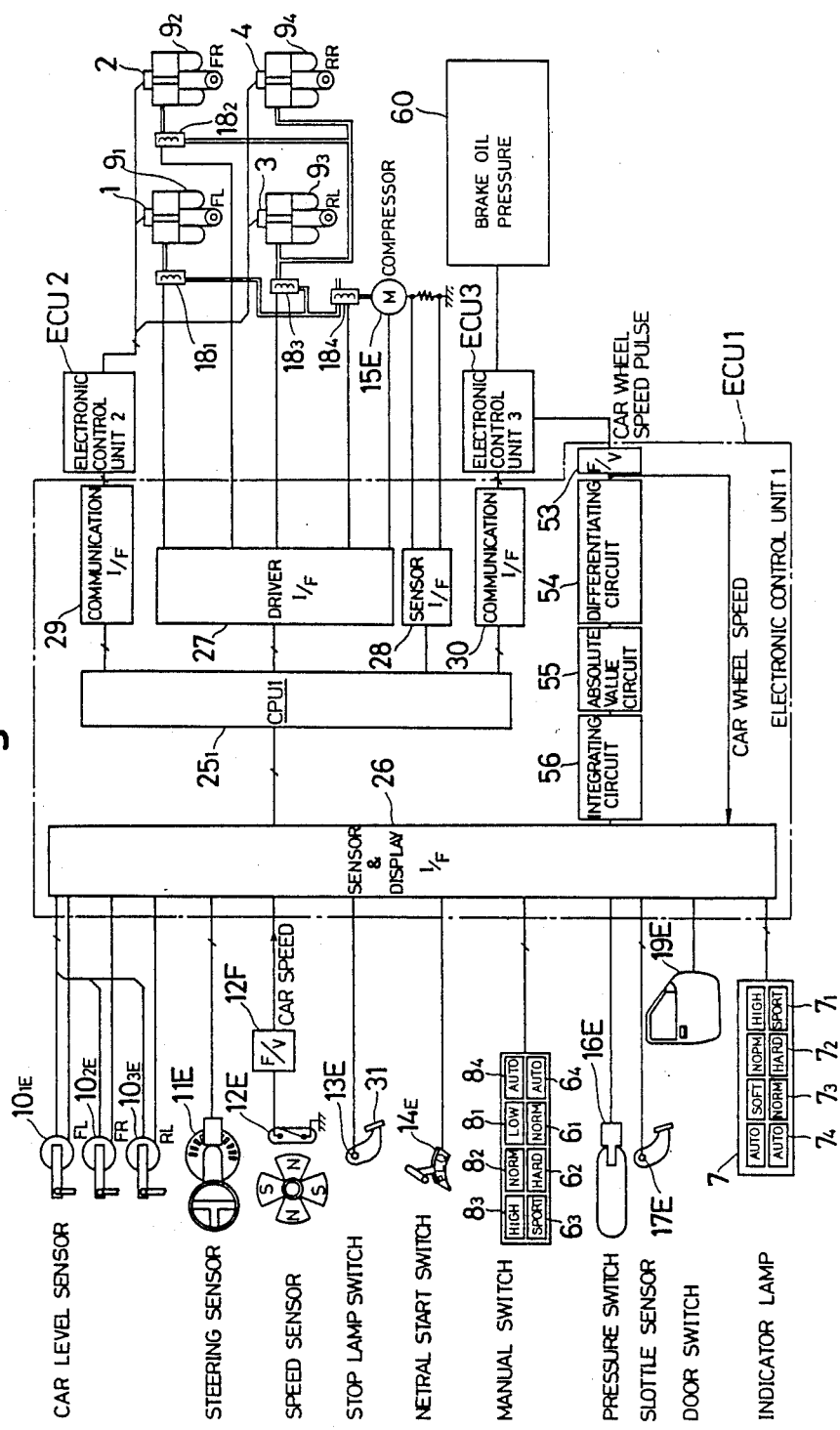
FIG. 1 is a block diagram showing an outline of the structure of a preferred embodiment of the present invention.

An outline of a preferred embodiment of the present invention in its entirety is shown in FIG. 1. This embodiment is executes anti-skid control, attenuating capacity control of shock absorbers, and car level control; which control is that of detecting the road surface condition by multiple steps, lowering the sensitivity of anti-skid control as the road surface condition becomes worse, making the attenuating capacity of the shock absorber larger, and setting the car level to be raised.

That is to say, this embodiment executes car level control in response to the closing operation of car level setting instruction switches $8_1$–$8_4$ of the switch handling board 5 (air pressure control of shock absorbers $9_1$–$9_4$), attenuating capacity control of shock absorbers in response to the closing operation of attenuating capacity instruction switches $6_1$–$6_4$ (regulation of rotary valves for liquid flow and rotary valves for air flow) and anti-skid control by detecting the slipping rate of each car wheel; however, when "automatic (AUTO)" is instructed at the car level setting instruction switches $8_1$–$8_4$, the car level is adjusted to be higher as much as the road worsens in response to the road surface condition, when "automatic (AUTO)" is instructed at the attenuating capacity instruction switches $6_1$–$6_4$, the attenuating capacity is adjusted to be larger as the road worsens in response to the road surface condition, and in anti-skid control, the slipping rate (comparative value) for starting pressure reduction is made sequentially higher as the road surface condition worsens, thereby adjusting it to the slipping rate (actual slipping rate) so that high frictional power taking into account the road surface may be obtained.

This control is executed by three electronic control units ECU 1-3 which have respectively a microprocessor (hereinafter called CPU) as a main component, and further comprise RAM, ROM, input and output ports, and input and output interfaces (logic IC and analogue electric circuits).

CPU 1 ($25_1$) of ECU 1 is the main CPU, wherein switches on switch handling board 5, indicating elements on indicating panel 7 arranged with indicating elements corresponding to the switches lighted in response to the "closing" of each switch, car level sensors $10_1E$–$10_3E$, rotary encoder 11E for the rotational angle detection connected to the steering wheel, lead switch 12E for car speed detection, stop lamp switch 13E becoming "closed" in response to actuation of the brake pedal, neutral start switch 14E to be closed when the shift lever is located at N, pressure switch 16E for detecting the accumulator pressure of air compressor 15E, throttle sensor 17E for detecting the amount (throttle valve opening degree) of accelerator pedal, air compressor 15E, electromagnetic opening and closing valves $18_1$–$18_4$, and door switch 19E, are all connected to the in and output ports of CPU 1 through the predetermined interfaces 16, 27 and 28.

CPU 1 ($25_1$) executes state reading of the switches of switch handling board 5, indicating control of the indicator panel, detecting of road surface conditions, car level data reading of the car level sensor, rotational angle calculation of the steering wheel, reading of car speed data and so on, state reading of various kinds of sensors and switches as well as data reading and calculation, and car level control in response to the state of car level control instruction switches $8_1$–$8_4$, at the same time, executing preparation of target attenuating capacity data corresponding to the state of attenuating capacity instruction switches $6_1$–$6_4$, and the transmitting of target attenuating capacity data and target slipping rate (slipping rate shift data) to the other two electronic control units ECU 2 and ECU 3.

Figure 7A:
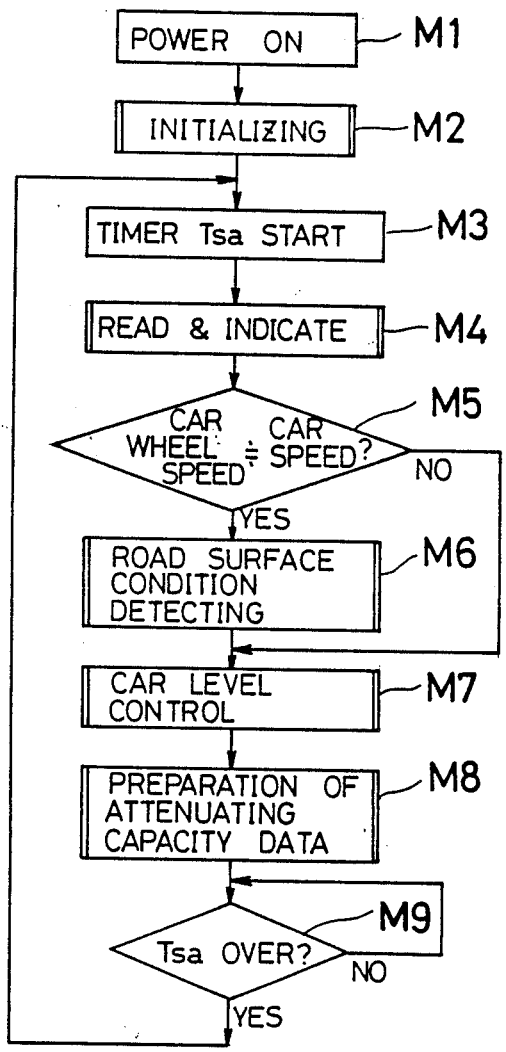
FIG. 7C is a group of graphs showing a relation between the car wheel speed, and the integrated voltage of the absolute value of car wheel speed and said acceleration.
FIGS. 7D, 7E, 7F and 7G are graphs showing the relations respectively between the slipping rate of the car wheel with respect to the road surface and the frictional coefficient of the car wheel with respect to the road surface.

An outline of control operation of CPU 1 of electronic control unit ECU 1 is shown in FIG. 7A. When power is inputted (step 1 : hereinafter the word "step" is deleted within parenthesis), CPU 1 sets its input and output ports to the signal level of a stand-by state and sets the internal registers, counters, timers and the like to the standby state (M2). Starting the timer (program timer) Tsa, reading in the input to the CPU 1, and when a state change is presented at switches $6_1$–$6_4$, $8_1$–$8_4$, switching the indication of indicating lamp 7 in response to this are then performed (M4).

Then follows the reading of input, reading the switch or state signal (binary value) of sensors, at the same time, reading by A/D conversion the generating voltage (an analogue signal representing the car speed—car speed signal) of a converter generating a voltage proportional to the frequency of electric pulses that a lead switch 12E generates in response to the rotation of a magnet rotor connected to the output shaft of a transmission means, reading by A/D conversion the voltage (motor load signal) proportional to the current value into the compressor motor and reading by A/D conversion the output voltage (car wheel speed signal) of F/V converter 53 representing the rotational speed of the front right car wheel.

CPU 1 then compares the car wheel speed data obtained at said reading (M4) with car speed data, checking whether or not both are substantially equal (M5). When "yes", CPU 1 proceeds by executing the road surface condition detecting (M6) and subsequently executing the car level control (M7). When "no", for example because the car wheel (FR) has large slippage, and the reliability of the car wheel speed is low, causing reliability of road surface condition detection based on this car wheel speed to become lower, CPU 1 proceeds by advancing to car level control (M7) without executing the road surface condition detecting step. When the car level control (M7) is executed, CPU 1 then executes preparation (M8) of attenuating capacity data, subsequently checking whether or not the timer Tsa has run (M9), and when it has run, returning again to step M3, and executing the process after the starting (M3) of said timer Tsa. Accordingly, CPU 1 executes steps M3–M8 within a period which is limited to the value of timer Tsa.

Figure 7B:
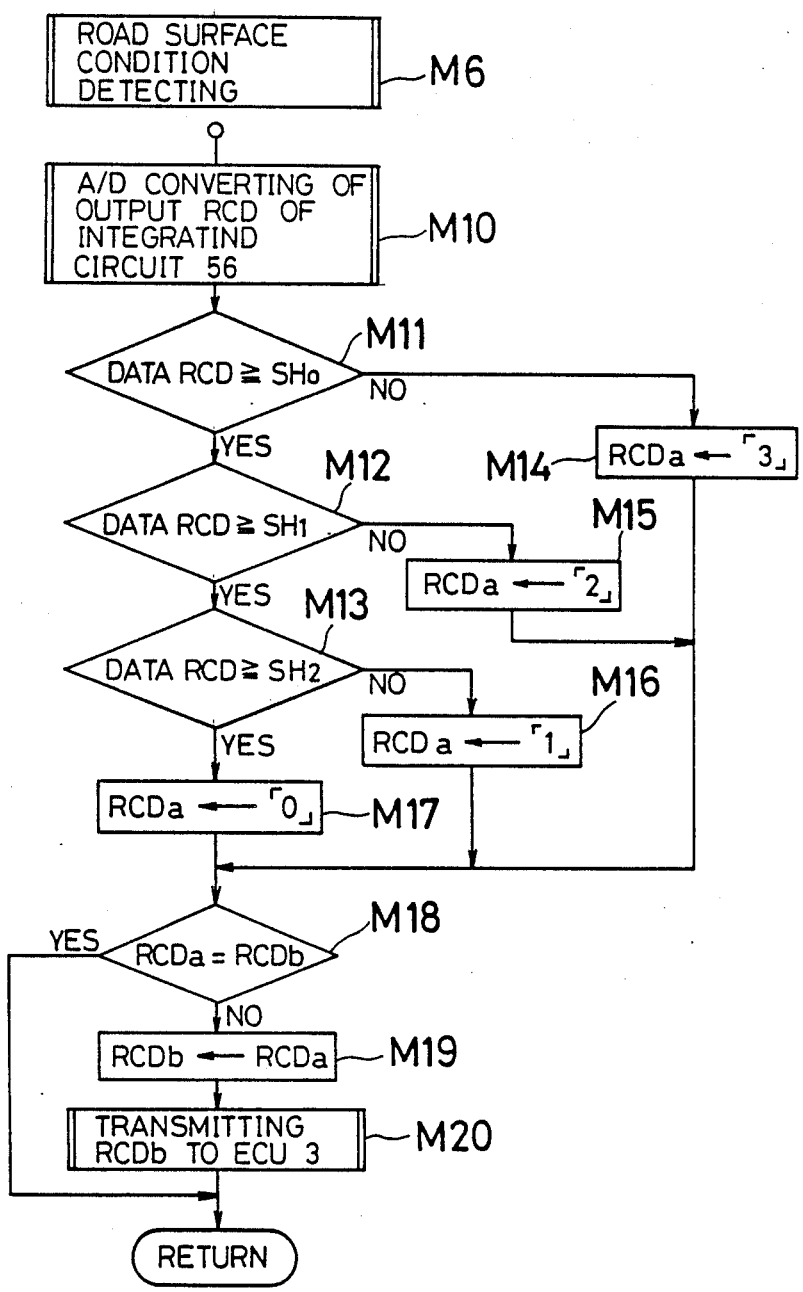

The content of aforementioned "road surface condition detecting" block (M6) is shown in FIG. 7B. When proceeding to "road surface condition detecting" (M6), CPU 1 first reads by conversion to digital the output (integrated voltage) of integrating circuit 56 (M10).

Here the output of this integrated circuit 56 will be explained. A speed sensor 42fr (FIG. 5) generating one pulse during the rotation through a predetermined angle of the car wheel is mounted to the front right car wheel FR, and the pulse generated by this is applied to F/V converter 53 of ECU 1 through the electronic control unit ECU 3, and the F/V converter 53 produces an analogue voltage representing the rotational speed (circumferential speed) of the front right car wheel FR. This analog voltage is applied to the differentiating circuit 54 producing a differential signal (it is positive when the car wheel speed is increasing, having a voltage level proportional to the increasing speed; it is negative when the car wheel speed is dropping, having a voltage level proportional to the decreasing speed). This differential signal represents the changing rate of car wheel speed. The absolute value circuit 55 produces an analog voltage (a positive voltage proportional to the absolute value of said changing rate) representing the absolute value (full wave rectified value) of this differential signal. The integrating circuit 56 integrates this analog voltage, and CPU 1 reads the integrated voltage by converting it to digital data at said step M4.

Figure 7C:
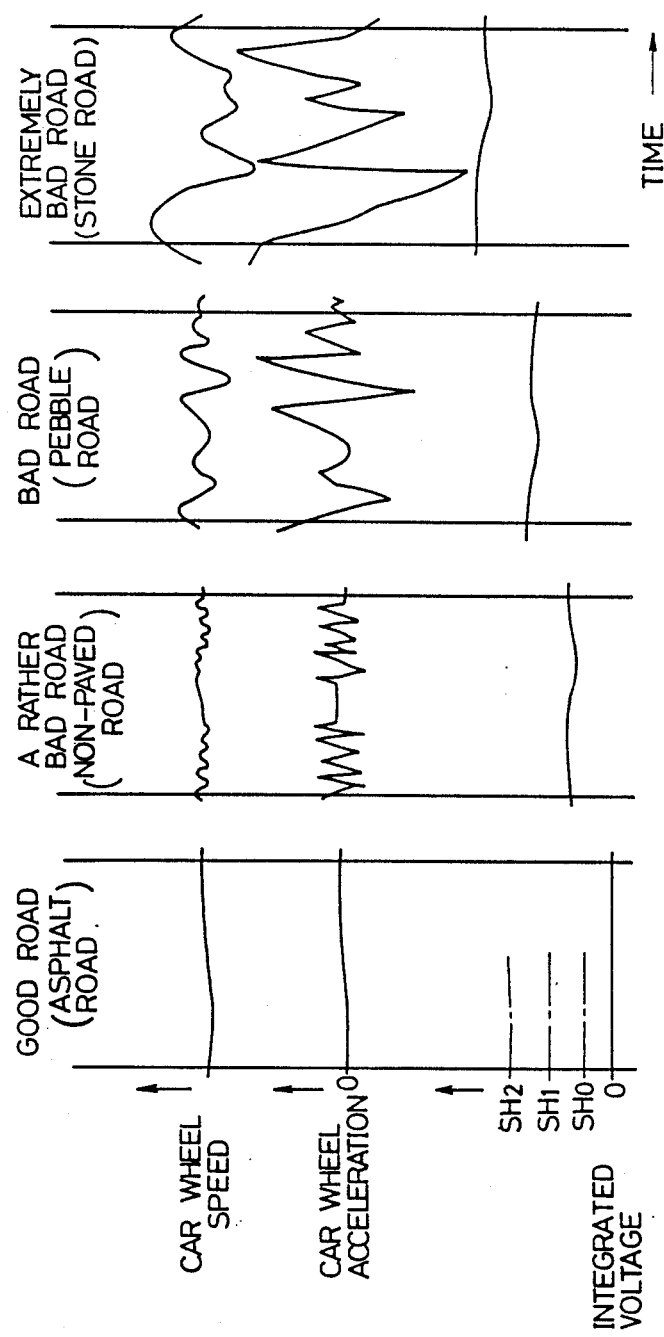
Figure 7D:
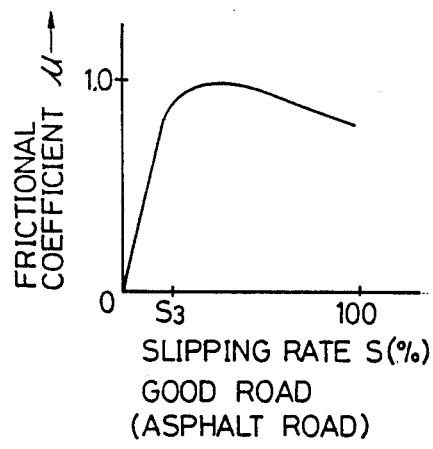
Figure 7E:
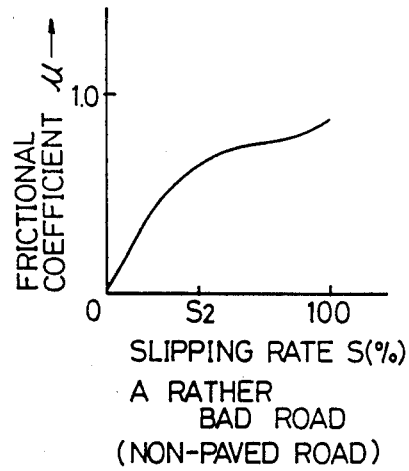
Figure 7F:
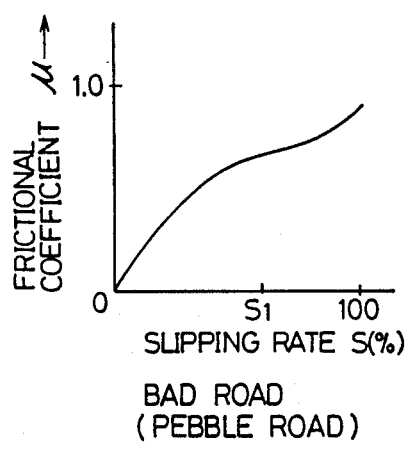
Figure 7G:
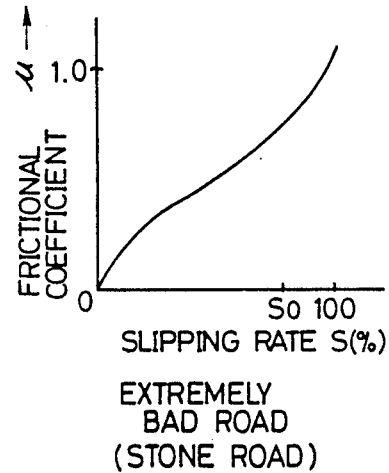

Here, referring to FIG. 7C, when the road surface condition is of various kinds as shown in the drawing, the car wheel acceleration, i.e., the changing rate of car wheel speed, is changed as shown in the drawing, and the integrated voltage becomes a high value as the road surface is worse for driving as shown in the drawing Therefore, as shown in FIG. 7C, this embodiment sets three different comparing reference values $SH_0$–$SH_2$ so as to detect the road surface condition from the value of the integrated voltage.

Referring to FIG. 7B again, when CPU 1 converts the integrated voltage which is the output of integrating circuit 56 to the digital data RCD, it proceeds by comparing the data RCD with the comparing reference values $SH_0$–$SH_2$ (M11–M13), when the data RCD is over the third reference value $SH_2$ which is the highest reference value, the CPU 1 proceeds by detecting it as a worst road and writing (M17) "0" representing this to the road surface condition register RCDa, when the data RCD is over the second reference value $SH_1$ and under the third reference value $SH_2$, detecting it as bad road and writing "1" representing this to the road surface condition register $RCD_a$ (M16), when the data RCD is over the first reference value $SH_1$, detecting it as a rather bad road and writing "2" representing this to the road surface condition register $RCD_a$ (M16), when the data RCD is over the first reference value $SH_1$, detecting it as a rather bad road and writing "2" representing this to the road surface condition register RCDa (M15), and when the data RCD is under the first reference value $SH_0$, detecting it as good road and writing "3" representing this to the road surface condition register RCDa (M14).

Then CPU 1 compares the content RCDa of the register RCDa with the content RCDb of register RCDb (detected value last time) for preserving the road surface condition detecting value, and when the values are different, writes the RCDa to the register RCDb (M19), and transmits the data RCDb to ECU 3 (M20). When the values are the same, this transmission is not executed.

The road surface condition is detected by the execution of "road surface condition detecting" routine (M6) described above and the data representing this (3: good road, 2: a rather bad road, 1: bad road, 0: worst road) are stored to the register CDb of CPU 1, and when the detected data become different than that detected before, it is transmitted to ECU 3. That is to say, the data representing the road surface condition is transmitted to ECU 3 at a time point when its content is changed, and ECU 3 thereby obtains the content of the road state detection data during operation.

Next, the content of the "car level control" step (M7) will be described in detail hereinafter.

CPU 1, when any of the car level control indicating switches $8_1$–$8_3$ of $8_1$–$8_4$ is closed, sets the car level value corresponding to the switch that is "closed", and proceeds by comparing this with the detected value of the car level sensor, executing the opening and closing control of electromagnetic opening and closing valves $18_1$–$18_4$ and the energizing and stopping control of the air compressor 15. When the switch 84 is "closed", the driving condition of the car and the road condition are tested on the basis of the detected value of the car level sensor and its variation, the car speed and its increasing and decreasing accelerations, and the road surface detection data RCDb of the register RCDb, and CPU 1 proceeds by setting the optimum car level target, and executing automatic control of the car level, raising the actual car level. With respect to only the road surface condition detecting data RCDb in the case when the car is running straight with a speed of predetermined range and is normal and stable, the previous step involves setting the car level target to the lowest car level in the case that RCDb is 3 (good road), setting the car level target to a rather low car level in the case that RCDb is 2 (a rather bad road), setting the car level target to high car level in the case that RCDb is 1 (bad road), and setting the car level target to the highest car level in the case that RCDb is 0 (worst road).

Next, the content of the "preparation of the attenuating capacity data" step (M8) will be explained in detail CPU 1, when any of absorbing power indicating switches $6_1$–$6_3$ of $6_1$–$6_4$ is "closed", transmits the attenuating capacity data of "closed" corresponding to the switch to the electronic control unit ECU 2 by preparing four sets in total, one for the shock absorber $9_1$ of the front left car wheel FL, one for the shock absorber $9_2$ of the front right car wheel FR, one for the shock absorber $9_3$ of rear left car wheel RL, and one for the shock absorber $9_4$ of rear right car wheel RR. When the switch $6_4$ is "closed", CPU 1 proceeds by presuming the driving condition of car and the road condition on the basis of the rotational angle of the steering wheel and its changing rate, the car level target value, the changing rate and changing period of a detection value of the car level sensor, the car speed and its increasing and decreasing acceleration, ON-OFF of the brake, the throttle opening degree, and the content RCDb of the register RCDb; and calculating the optimum attenuating capacity data at every shock absorbers $9_1$–$9_4$ of each car wheel in the presumed state, and transmitting it to ECU 2.

Each pulse motor 1–4 of the shock absorbers $9_1$–$9_4$ is connected to the input and output ports of CPU 2 of ECU 2 through the output interface. CPU 2 of ECU 2 sets the attenuating capacity and spring constant of shock absorbers $9_1$–$9_4$ (the sum of which is called absorbing power) by executing forward/reverse rotational energizing control of the pulse motor with the attenuating capacity data received by transmission from CPU 1 as a target value.

Figure 2A:
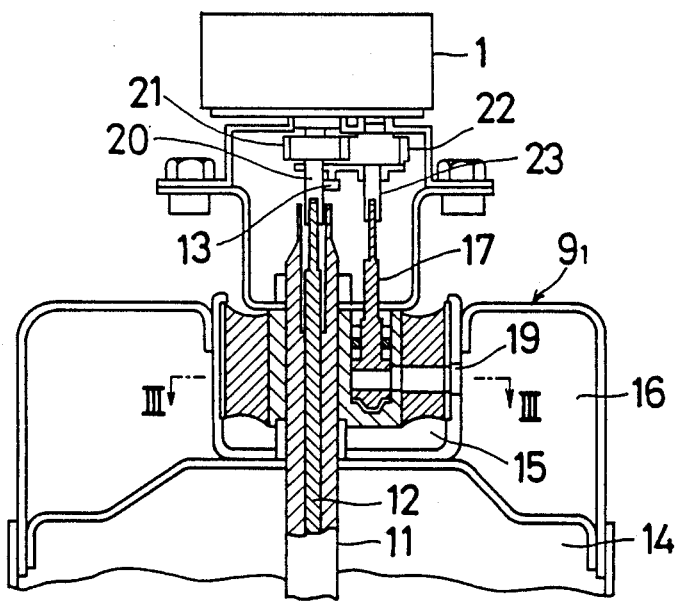
FIG. 2A is a cross sectional view of shock absorber $9_1$ shown in FIG. 1, which shows an upper half.
Figure 2B:
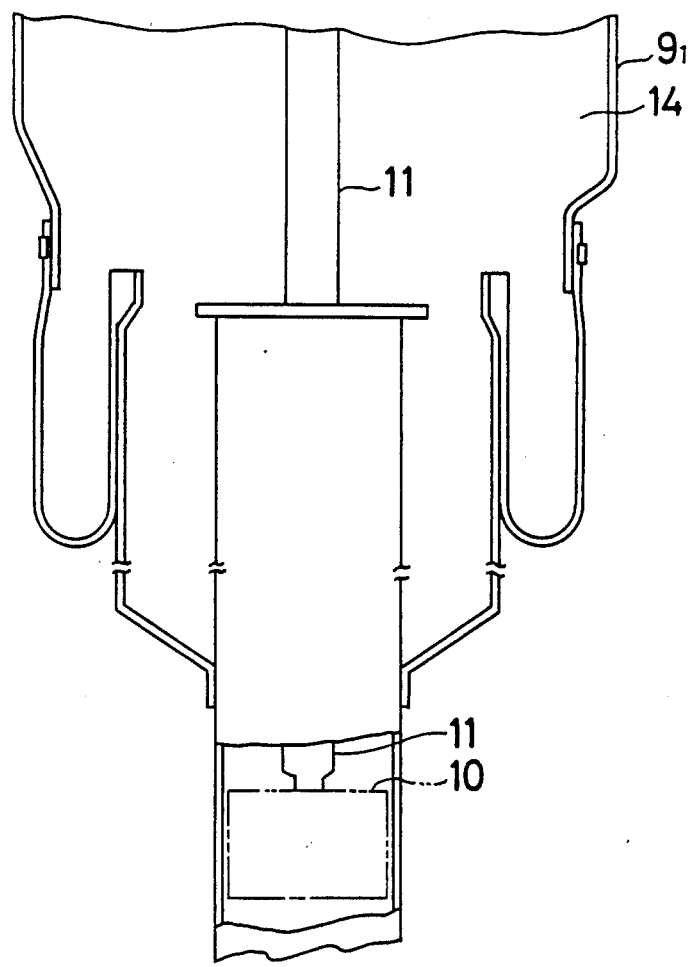
FIG. 2B is a cross sectional view of shock absorber $9_1$, which shows a lower half.

The structure of an upper portion of the shock absorber $9_1$ of front left car wheel FL is shown in FIG. 2A, and the structure of a lower portion is shown in FIG. 2B. Numeral 10 shown by the two-dot chain line in FIG. 2B shows a known piston for dividing the reservoir containing oil into 2 parts. A known first rotary valve communicating the lower space of the piston with the upper space is mounted to the piston, and a control rod 12 (FIG. 2A) passes through a rod 11 which is fixed to the piston and receives the car load. The first rotary valve is changed continuously in opening degree from fully open to a predetermined opening degree by the rotation through a predetermined range within 360° of control rod 12. After the control rod 12 is driven to rotate in the direction of fully open and the rotary valve has passed the point of fully open, a stopper 13 fixed to the control rod 12 contacts the coupling piece of a fixing portion, so that further rotation of rod 12 is obstructed. Thus, a state of the stopper being contacted is taken as a reference position of control rod 12 in this embodiment. Main air chamber 14 is communicated with valve operating chamber 15, and a second rotary valve 17 is interposed in the air-flow path between the valve operating chamber 15 and sub-air chamber 16.

Figure 3:
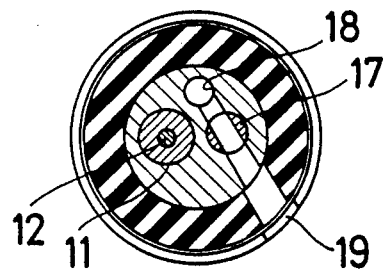
FIG. 3 is a cross sectional view taken along the line III—III of FIG. 2A.

A cross sectional view taken along the line III—III of FIG. 2A is shown in FIG. 3. Port 18 is communicated with air chamber 14 through the valve operating chamber 15, and port 19 is communicated with sub-air chamber 16. The case wherein second rotary valve 17 is matched with the air flowing path between the ports 18-19 as shown in FIG. 3 corresponds to full opening of the valve, and the case of being rotated 90° from that corresponds to full closing of the valve.

A rotational shaft 20 of pulse motor 1 fixed with first gear 21 is connected to the control rod 12, and second rotary valve 17 is connected to the rotational shaft 23 fixed with second gear 22 meshing with first gear 21. The meshing gear ratio of the first and second gears and positioning of the control rod 12 and second rotary valve 17 are established such that second rotary valve 17 is fully opened when the first rotary valve is fully opened.

Figure 4:
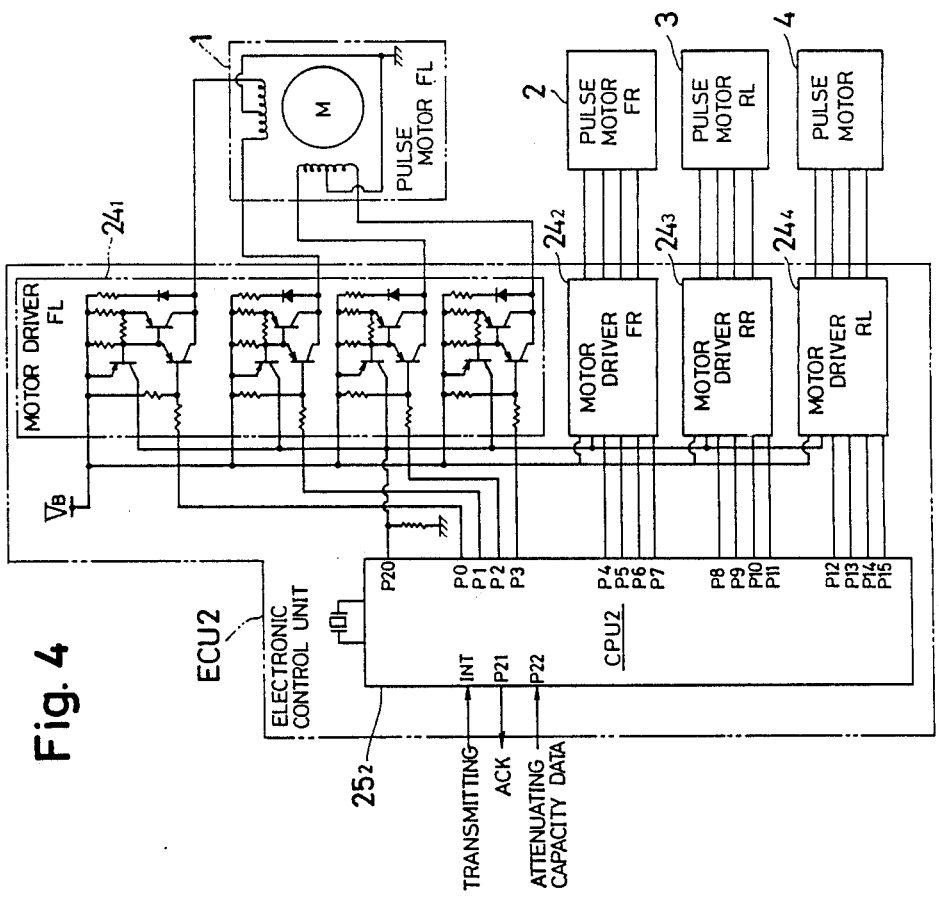
FIG. 4 is a block diagram showing the structure of an electronic control unit ECU 2 shown in FIG. 1, which shows microprocessor CPU ($25_2$) for controlling the attenuating capacity of shock absorbers $9_1$-$9_4$ and interfaces $24_1$-$24_4$.

The structure of the electronic control unit ECU 2 is shown in FIG. 4. This ECU 2 has CPU 2 ($25_2$) which receives the attenuating capacity data from CPU 1, energizing the pulse motors $9_1$–$9_4$ and establishing the attenuating capacity (absorbing power) that said data indicates to shock absorbers $9_1$–$9_4$, and the motor drivers $24_1$–$24_4$.

The pulse motor 1 is a four-phase motor, and the motor driver $24_1$ energizes this motor 1 by two-phase excitation. The phase energizing data of one cycle is stored in ROM of auxiliary CPU 25. Said phase energizing data is read out during a predetermined period by the sequencing of memory addresses and
sent to the output ports $P_0$–$P_3$ so that the pulse motor is normally rotated. When the data is read out in the reverse sequence, the pulse motor 1 is reversely rotated. Pulse motors 2–4 also have same structure as 1, and the motor drivers $24_1$–$24_4$ have same structure as $24_1$.

Further, CPU 1 transmits new attenuating capacity data to CPU 2 only when the attenuating capacity to be established at any of absorbers $9_1$–$9_4$ becomes different than has been instructed before.

The attenuating capacity control operation of CPU 2 ($25_2$) is shown in FIGS. 8A–8D. This control operation will be described in detail hereinafter. When the power turned on (1) CPU 2 ($25_2$) executes initialization (2), and thereafter sets n into each of address registers FL, FR, RL and RR. This n is a maximum address for the reading out of the phase energizing data table of ROM from CPU 25. CPU 2 proceeds by determining the memory address using the data n of register FL, reading out the phase energizing data (4-bit data applied to each phase of pulse motors 1–4) from the phase energizing data table and sending it to each of output ports 0–$P_3$, $P_4$–$P_7$, $P_8$–$P_1$1, and $P_{12}$–$P_{15}$ (4) Next, CPU 2 proceeds by updating the content (initial value 0) of a register i for counting the phase energizing switching number (clock number) of pulse motors 1–4 (5), in order to determine the phase switching period dt, and by setting the time limit dt into a timer (program timer); thereafter waiting for the lapse of time limit dt (7), and when elapsed, comparing the content i of register i with m (8) where m is the phase energizing switching number (clock number) of the pulse motor (energized in reverse rotation) required to drive the control rod 12 from fully closed position to fully opened position.

When the content i of register i is under less than m (8), CPU 2 proceeds by continuing the reverse rotational energizing of pulse motors 1–4, and depending on whether or not the phase energizing data is read out (content of registers FL-RR is respectively 1) up to the end address of the phase energizing data table (9), decreasing the content of address registers FL-RR by "1" (updating the value by subtracting 1 from the contents of the register) (10). When the content of register FL has become 1, since the reading down to the lowest address of the phase energizing data table is terminated, CPU 2 proceeds by setting n again into the registers FL-RR so as to restore the reading out address to the largest address n (3), then, returning to step 4, determining the address by the content of register RL, reading out the data from the phase energizing data table, and sending it to each of the output ports P0-P4, P4-P7, P-P11, and P12-P15 (4), and next updating the content of register i for counting the phase energizing switching number (clock number) of pulse motors 1–4 to the value increased by 1 (5), in order to determine the phase switching period dt, setting the time limit dt (7), and when elapsed, comparing the content i of register i with m (8). Thus, while increasing the address from the phase energizing data table until i becomes m, CPU 2 reads out the phase energizing data at dt intervals sequentially, sending it to each of output ports P0-P3, P4-P7, P-P11, and P12-P15, and energizing the pulse motors 1–4 in the reverse rotation. When i=m, the stopper is contacted to the coupling piece at each of the shock absorbers $9_1$–$9_4$, and it becomes impossible to rotate reversely any more (being at the reference point). Although the rotational angle of the control rod before energization is unknown and the control rod reaches the reference position before the motor energization during the aforementioned clock pulse interval is completed such that the pulse motor is forcibly stopped, since the motor energizing interval of m clock pulses is a short period of time, there is no problem electrically or mechanically. However, when it is desired to avoid this forcible stop a nonvolatile RAM may be provided, and the actual opening degree data described hereinafter stored to it.

Meanwhile, when terminating the energizing of pulse motors 1–4 of m clock pulse duration, CPU 2 stores respectively the actual opening degree data Pa=0 (reference position) in the position registers FL, FR, RL and RR (11).

According to the above, first and second rotary valves are operated to locate the limiting position at the fully open side, and the corresponding opening degree data is set in each of registers FL–RR.

Thereafter, CPU 2 refers to the updating flag (12). The updating flag is set whenever attenuating capacity data (opening degree instruction data) is newly received from CPU 1. Data transmission from CPU 1 to CPU 2 is executed by applying an interrupt to CPU 2. Here, the interrupt handling process of CPU 25 will be described in detail with reference to FIG. 8D. Explaining firstly the data structure that CPU 1 transmits to CPU 2, the attenuating capacity data is 1 byte (8 bits) as shown in FIG. 9A. When designating the bit numbers as 1–8 beginning with the lowest position bit LSB, the seventh and eighth bits are those applied to the shock absorber $9_1$, the fifth and sixth bits are those applied to the shock absorber $9_2$, the third and fourth bits are those applied to the shock absorber $9_3$, and the first and second bits are those applied to shock absorber $9_4$.

Figure 9A:
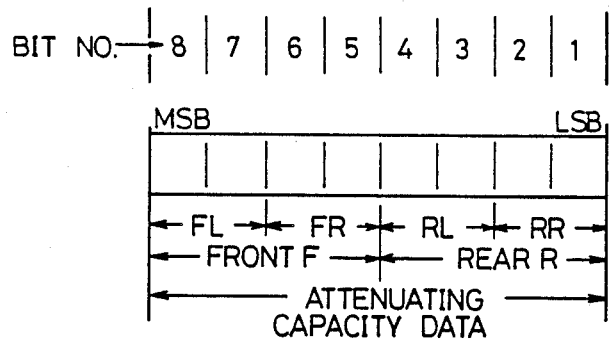
FIG. 9A is a plan view showing the structure of an attenuating capacity data that microprocessor CPU 1 ($25_1$) of electronic control unit ECU 1 transmits to the microprocessor CPU 2 of ECU 2.
Figure 9B:
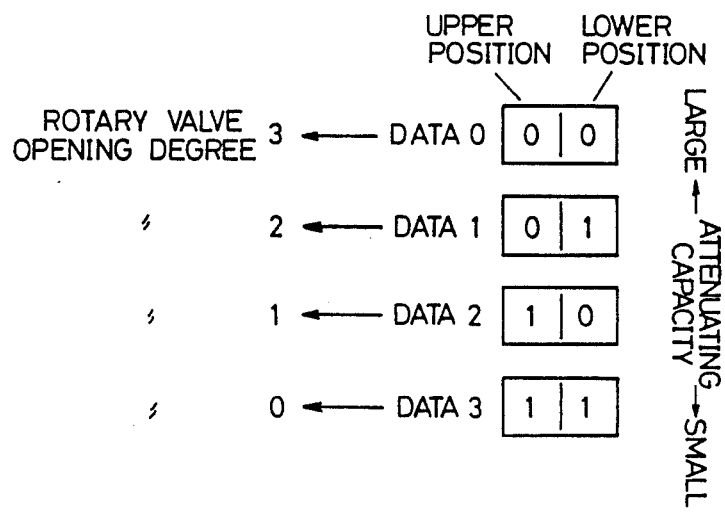
FIG. 9B is a plan view showing the content of the attenuating capacity data.

Each two bits of data assume the form shown in FIG. 9B. That is to say, 00 representing the data 0 indicates the valve opening degree 3 (fully open), 01 representing the data 1 indicates the valve opening degree 2 (a little less than full opening toward the closing side), 10 representing the data 2 indicates the valve opening degree 1 (a little less than full opening toward the opening side), and 11 representing the data 3 indicates the valve opening degree 0 (fully closed). CPU 1 prepares new attenuating capacity data (1 byte as in FIG. 9A) when the situation is changed at a moment when either the switches $6_1$–$6_4$ are switched or $6_4$ is in the closed state and any one of the attenuating capacities of the shock absorber is charged by applying the interrupt to CPU 2 (outputting the low level "0" to the interrupt port INT of CPU 2), whereupon CPU 2 transmits the acknowledgement signal SCK (low level "0" of 1 bit) and CPU 1 sends out the attenuating capacity data (1 byte) serially.

With respect to the relation between the aforementioned road surface detecting data RCDb and said attenuating capacity data when the car is running straight in a stable, normal condition, in this case, CPU 1 takes RCDb as the attenuating capacity data as it is. Accordingly, the attenuating capacity data becomes 0 representing the largest attenuating capacity when the road surface condition is 0 (worst road), the attenuating capacity data becomes 1 representing a large attenuating capacity when the road surface condition is 1 (bad road), the attenuating capacity data becomes 2 representing a rather large attenuating capacity when the road surface condition is 2 (a rather bad road), and the attenuating capacity data becomes 3 representing a least attenuating capacity when the road surface condition is 3 (good road).

Figure 8A:
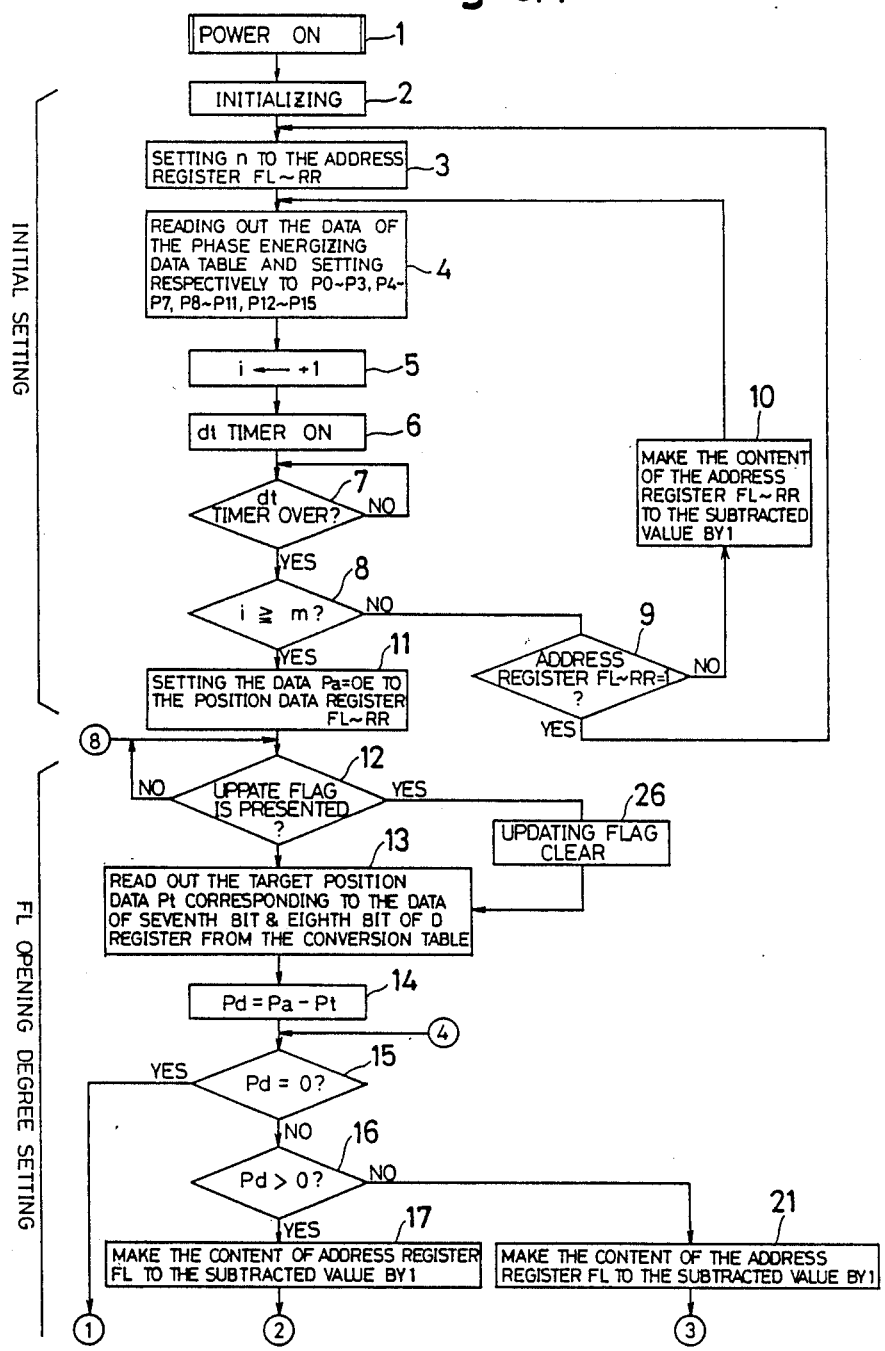
FIGS. 8A, 8B, 8C and 8D are flow charts showing the attenuating capacity setting control operation of microprocessor CPU 2 shown in FIG. 4, respectively.
Figure 8B:
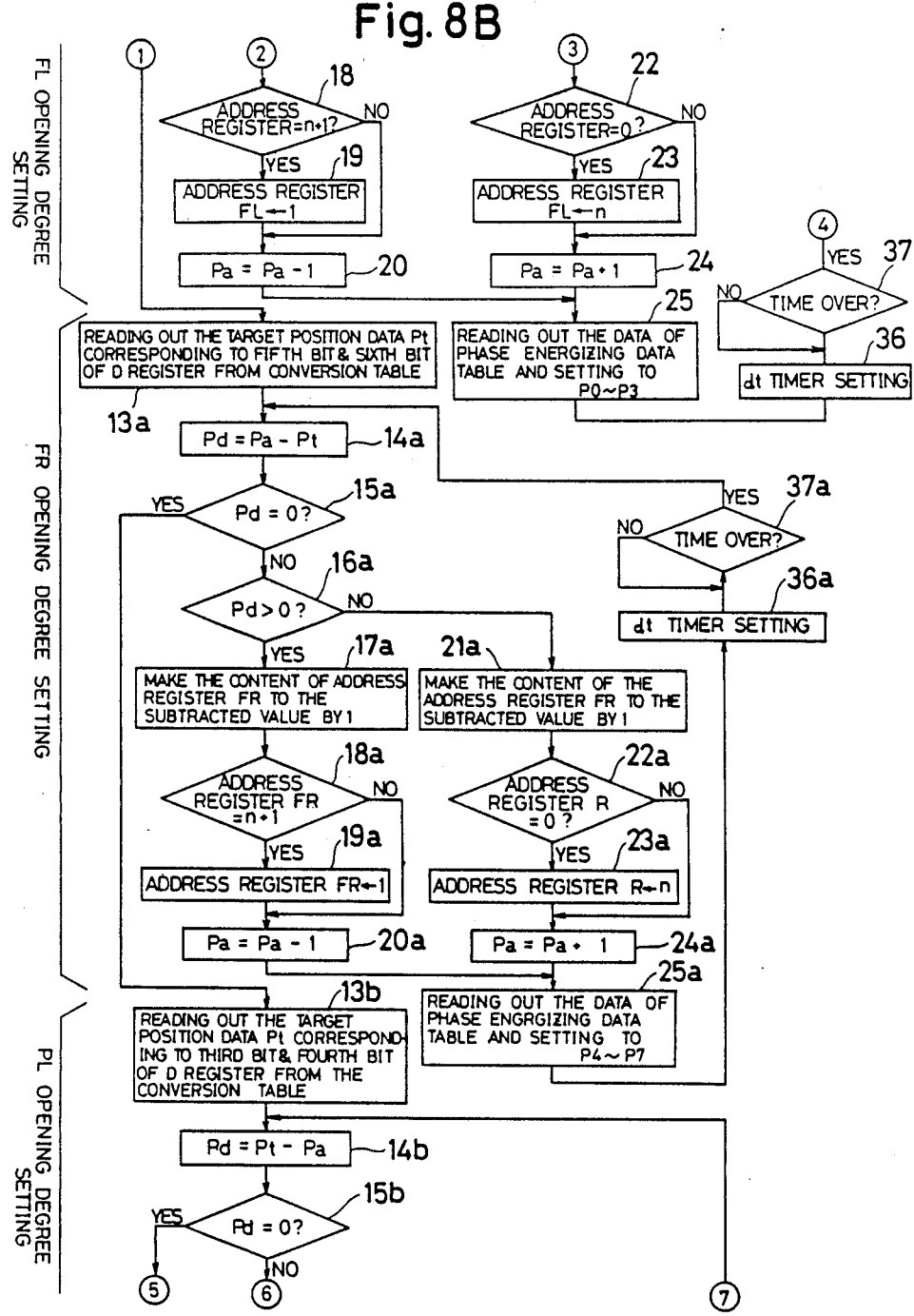
Figure 8C:
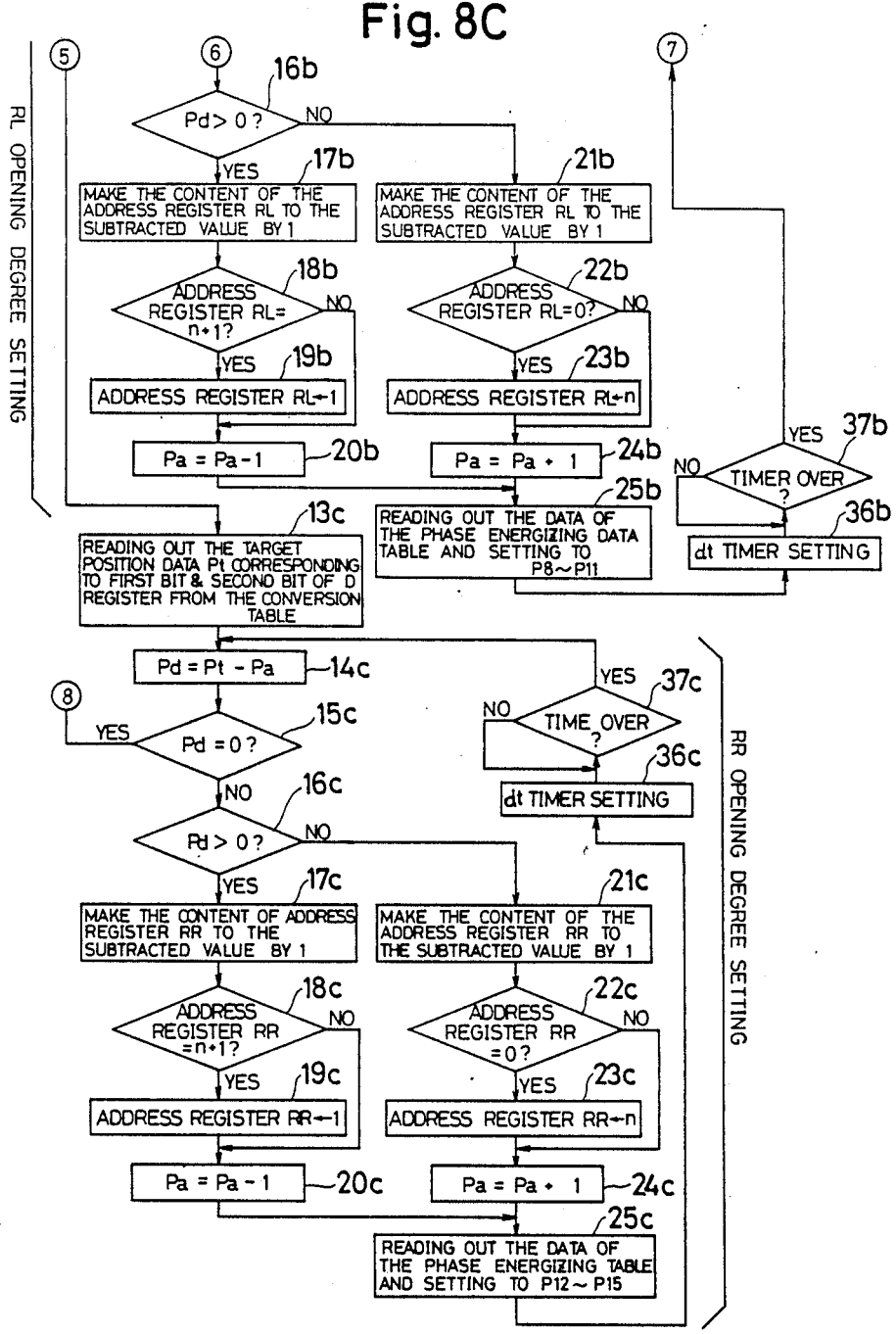
Figure 8D:
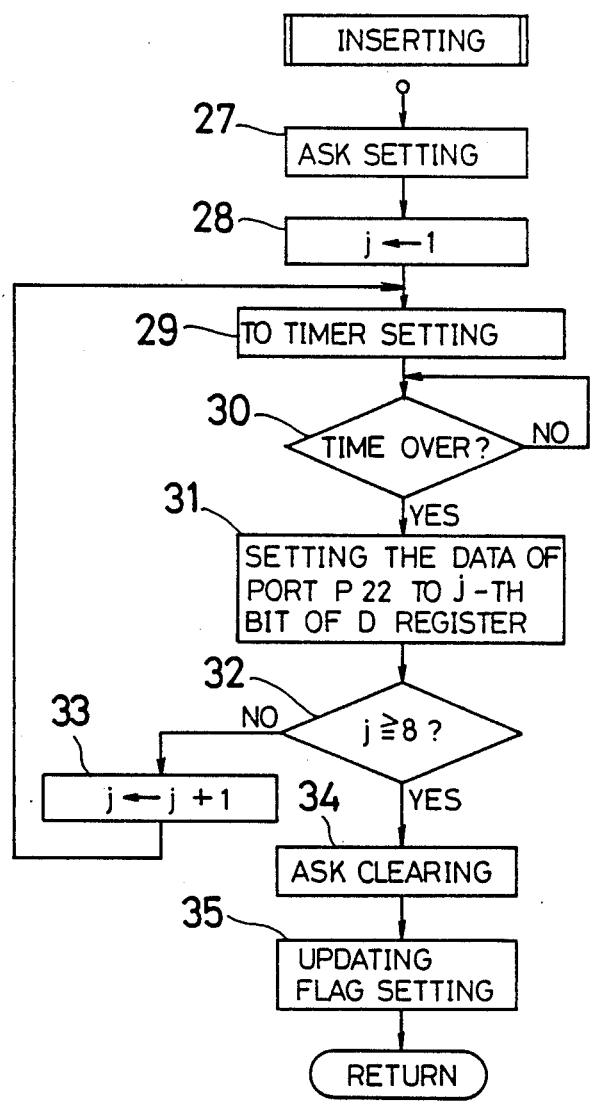

Referring to FIG. 8D, CPU 2 sets the output port P21 from high level "1" to low level "0" when it receives the interrupt (27), setting the initial value 1 into the bit address register j (28), and setting timer To (program timer) (29). When the time To is over, CPU 2 proceeds by storing the signal level (high level I or low level 0) of port P22 to the $j^{th}$ bit of the D register (8 bits) where j is the content of the bit address register j and when the content j of register j is under eight, increasing by one the contents of register j, returning to step 29 and setting timer To and waiting for the time to elapse (30). When the time is over, CPU 2 stores the signal level of port P22 to $j^{th}$ bit of the D register. The following is the same as before, and when the content of the register j becomes 8, since each bit of the attenuating capacity data (8 bits) are all then stored to all the bits of the D register (8 bits), CPU 2 proceeds by sending the high level to the port 21 (34) setting the updating flag (35), and returning to the main routine (FIGS. 8A–8C). Therefore, when it is necessary to change the attenuating capacity of any shock absorber, new data are transmitted to CPU 2, when this transmission is received, the contents of the D register of CPU 2 are replaced with new data, and the updating flag is set.

Referring to FIG. 8A again, CPU 2 tests the updating flag at step 12, and when it is not set waits there for the updating flag to be set. When the updating flag is set, CPU 2 first clears the updating flag (26), and executes the attenuating capacity setting control in the order of shock absorber $9_1$, $9_2$, $9_3$ and $9_4$.

To this end, CPU 2 first reads the data of the seventh bit and eighth bit of the D register, and reads out the target position data corresponding to the data (FIG. 9B) from the predetermined memory region (conversion table) of ROM of CPU 2 (13). Then, it calculates the positional deviation quantity $Pd = Pt - Pa$, in which the different quantities are identified as follows:

Pd : positional deviation quantity
Pt : target position data,
Pa : actual position data (content of position data register FL)

When Pd is not 0 (attenuating capacity setting control is necessary), CPU 2 proceeds by testing the positive/negative sign of Pd, and when it is positive energizing the pulse motor 1 in normal rotation by the loop of steps 17-18-19-20-24-36-37 -15-16-17, updating the actual position data Pa at every switching of the phase energizing data with each clock interval, and updating the position data register FL (20). When Pd=0 comes about by action of this positive rotational energizing, CPU 2 proceeds to the attenuating capacity setting of shock absorber $9_1$ after the step 13a. When Pd is negative, it proceeds to steps 21-22-23-24-25-36-37-15-1-6-21 and energizes the pulse motor 1 in reverse rotation, updating the actual position data Pa at every switching of the phase energizing data with each clock interval amount, and updating the position data register FL (24). When Pd=0 by means of this reverse rotational energizing, proceeding to the attenuating capacity setting of the next shock absorber after the step 13a. According to above, the opening degree (rotational angle) of the first and second rotary valves of shock absorber $9_1$ becomes to set the target value.

The attenuating capacity setting control of the shock absorbers $9_2$, $9_3$ and $9_4$ is quite the same as the attenuating capacity setting control of said $9_1$, and the control steps are also the same. Steps of setting control of $9_2$–$9_4$ which are in corresponding relation with steps of the setting control of $9_1$ in the drawing are represented by the addition of the letters a, b and c added to the symbol of the setting control symbol of $9_1$.

When terminating the attenuating capacity control of the shock absorbers $9_1$–$9_4$, CPU 2 return to step 12, and tests the presence or absence of the updating flag again. During execution of the attenuating capacity control of aforesaid shock absorbers $9_1$–$9_4$, when a transmission of new attenuating capacity data is presented, the updating flag is set again. When the updating flag is not set, CPU 2 stays at step 12, waiting the transmission of new attenuating capacity data, however when the updating flag is set, it clears the updating flag (26), executing the attenuating capacity setting control of the shock absorbers $9_1$–$9_4$ as aforementioned, and when terminating this, returns again to step 12. CPU 2 executes this attenuating capacity setting control so long as power is supplied to it.

In addition, in the aforementioned embodiment, since memory means for maintaining the data such as nonvolatile RAM and the like is not provided in case main power fails, when the power does fail, since actual position data (the contents of the position data register) is lost, as aforementioned, it is necessary to return to the reference position of the rotary valve immediately after the restoring of power and the setting of actual position data. However, providing memory means such as nonvolatile RAM and the like for maintaining the data in the electronic control unit ECU 2 even if main power fails, assigning the position data register to it, and storing the actual position data Pa therein is desirable.

Next, anti-skid control executed by electronic control unit CPU 3 ($25_3$) of ECU 3 will be explained in detail hereinafter. First, referring to FIG. 5 showing the arrangement of the brake oil pressure system 60 in the car, and explaining this, when a driver steps on the brake pedal 31, the brake pressure corresponding to the pedal amount is applied to the brake $36_2$ of the front right car wheel FR, brake $36_1$ of the front left car wheel FL, brake $36_4$ of the rear right car wheel RR and brake $36_3$ of the rear left car wheel RL through the electromagnetic switch valves 33, 33A, 34 and 34A.

Figure 5:
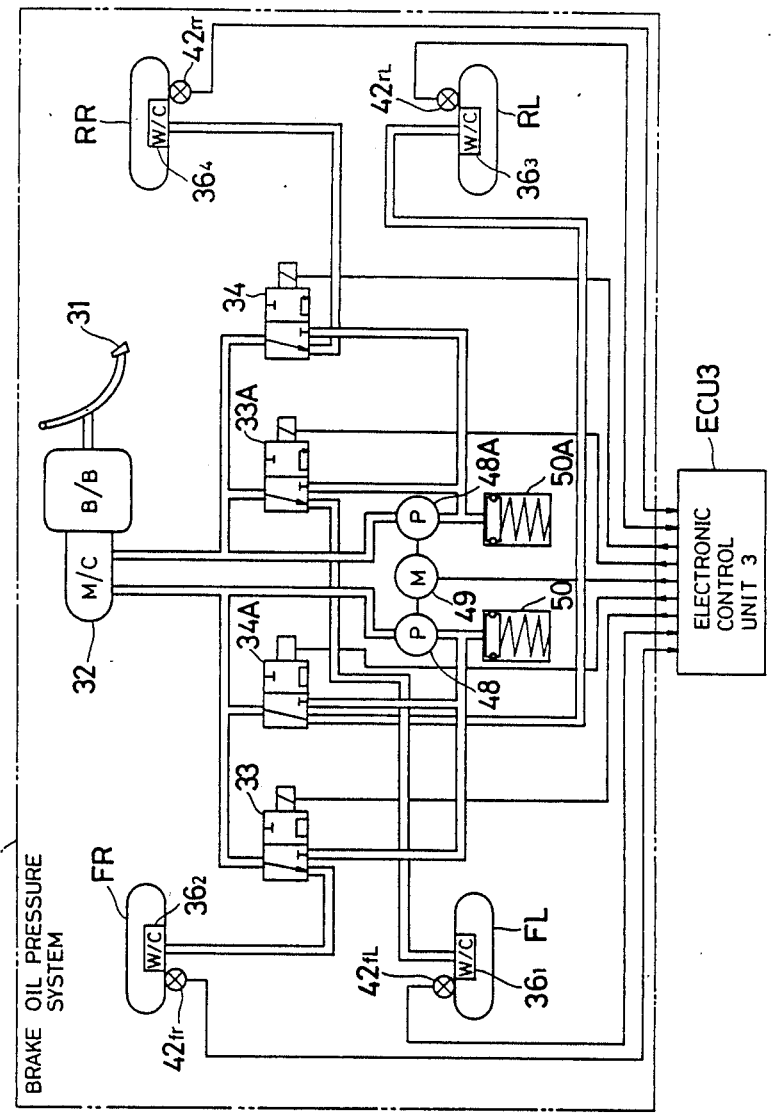
FIG. 5 is a block diagram showing the structure of a brake oil pressure system shown in FIG. 1.

The electromagnetic switch valves 33, 33A, 34 and 34A are two-position three-way valves, and when electric power conduction is not present, as shown in FIG. 5, the car wheel brakes $36_1$–$36_4$ are connected to the brake pressure output port of brake master cylinder 32 (increasing pressure setting). This output port is communicated with the high pressure output (discharging) ports of pumps 48, 48A driven by the electric motor 49. Low pressure output (suction) ports of the pumps 48, 48A are connected with reservoirs 50, 50A. The electromagnetic switch valves 33, 33A, 34 and 34A connect the car wheel brakes $36_1$–$36_4$ to the low pressure outputs of the pumps 48, 48A (decreasing pressure setting) when the conduction of electric power is presented to their electric coils. The rotational speed of the front right car wheel, the front left car wheel, the rear right car wheel and the rear left car wheel are detected by the speed sensors 42fr, 42fl, 42rr and 42rl.

The brake oil of reservoir 50 is sucked by the pump 48 and delivered to first electromagnetic switch valve 33 and fourth electromagnetic switch valve 34A, and the brake oil of reservoir 50A is sucked by the pump 48A and delivered to second electromagnetic switch valve 33A and third electromagnetic switch valve 34.

The electric coils of electromagnetic switch valves 33, 33A, 34 and 34A, the electric motor 49 and the speed sensors 42fr–42rl are connected to the electronic control unit ECU 3.

Figure 6:
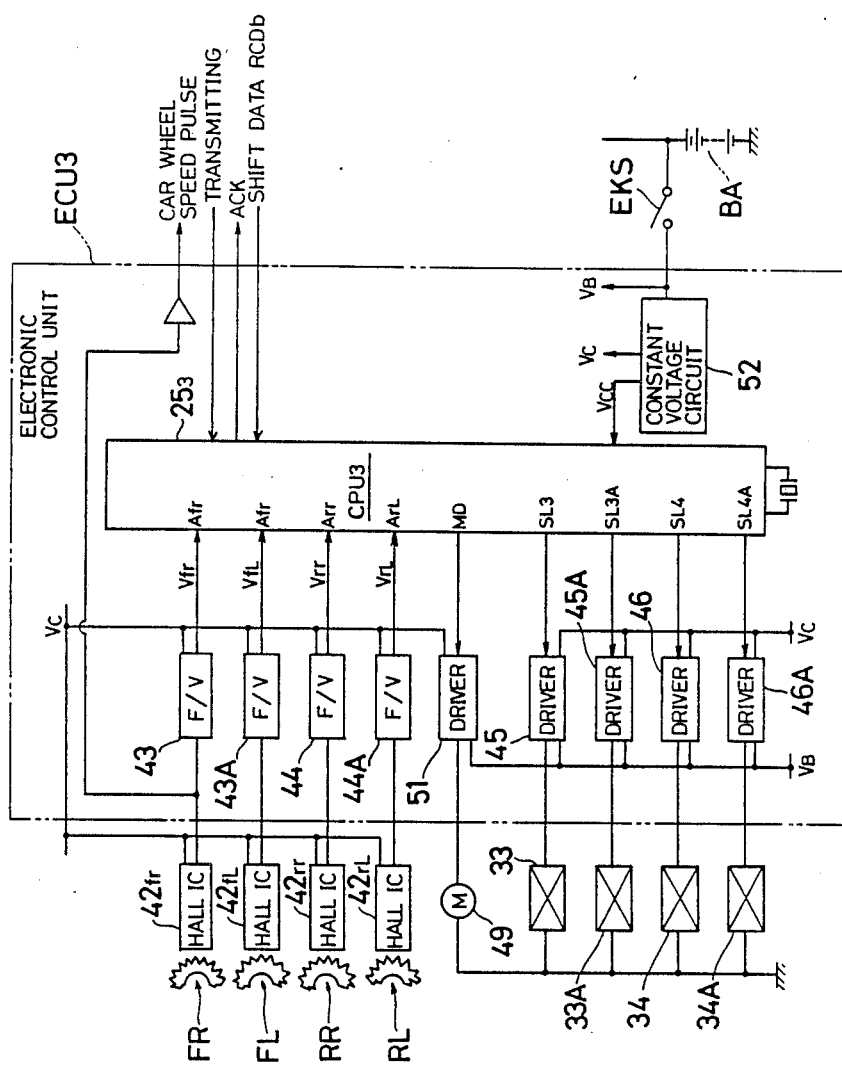
FIG. 6 is a block diagram showing the structure of an electronic control unit ECU 3 shown in FIG. 1, FIG. 7A and FIG. 7B are flow charts showing the control operation of CPU 1 shown in FIG. 1

The structure of the electronic control unit ECU 3 is shown in FIG. 6. The speed sensors 42fr–42rl are Hall ICs (containing Hall elements for detecting the high and low condition of an applied magnetic field, and a binarizing circuit for binarizing the detected signal), responsive to the rotation of permanent magnet rings of gear shape coupled to the car wheel shaft, generating an electric pulse of frequency proportional to the speed of said rotation These electric pulses are applied to F/V converters 43, 43A, and 44, 44A. F/V converters 43, 43A and 44, 44A generate voltages of a level proportional to the frequency of the input electric signal, and apply them to A/D converter inputs Afr–Arl of CPU 3 ($5_3$).

Constant voltage circuit 52 is connected to the battery BA in the car through the engine key switch EKS.

Figure 10A:
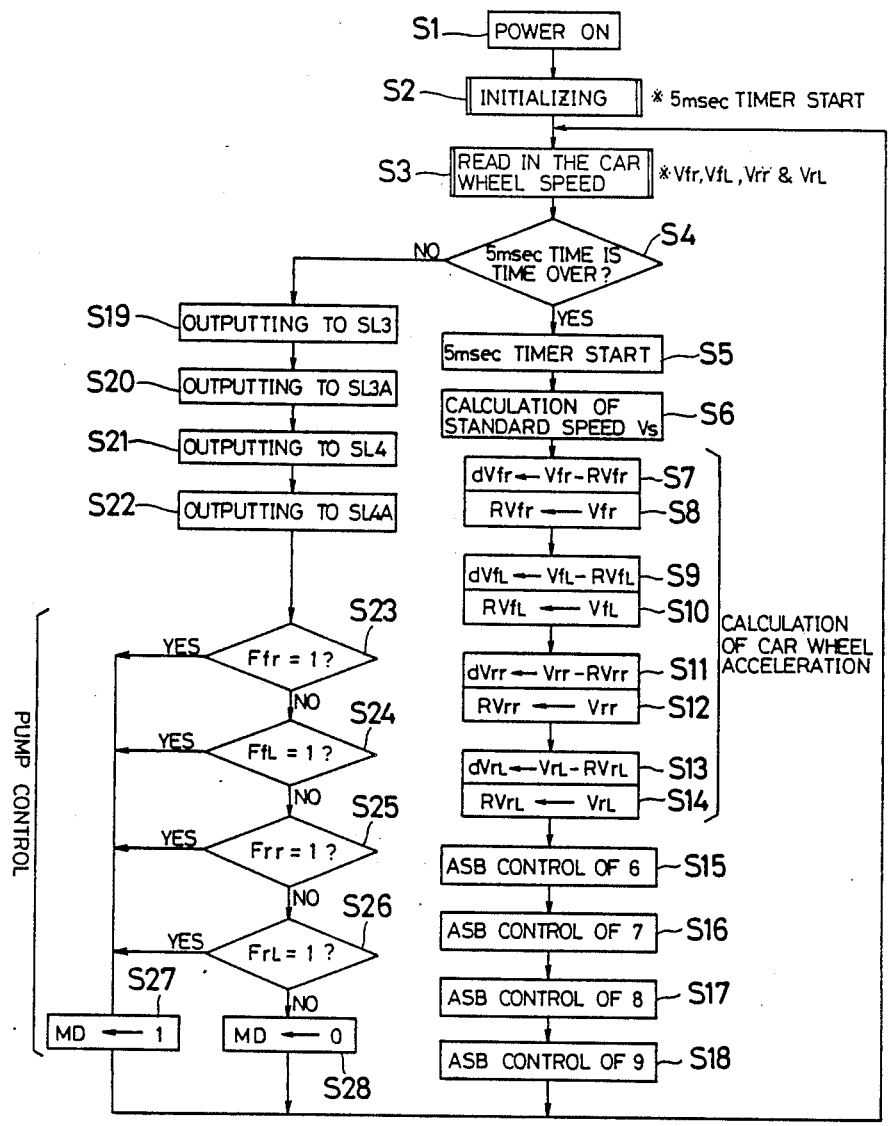
FIGS. 10A, 10B, 10C, 10D, 10E and 10F are flow charts showing the control operation of CPU 3 ($25_3$) shown in FIG. 6 respectively.

An outline of brake pressure control operation is shown in FIG. 10A. Referring to FIG. 10A, the brake pressure control operation may be summarized as follows:

(1) Initialization (1, 2):

CPU 3, when the switch EKS is closed and the constant voltage circuit 52 generates the constant voltage Vcc of a predetermined level, is started (S1), and clears the internal registers, counters, timer and the like, and outputs a logical zero (electric motor 49 nonconductive, pumps 48 and 48A stopped) to the output port MD, and outputs 0 (making the valves 33, 33A, 34, 34A assume the "increasing pressure" connection state shown in FIG. 5) to the output ports SL 3, SL 3A, SL 4 and SL 4A (S2).

Figure 10B:
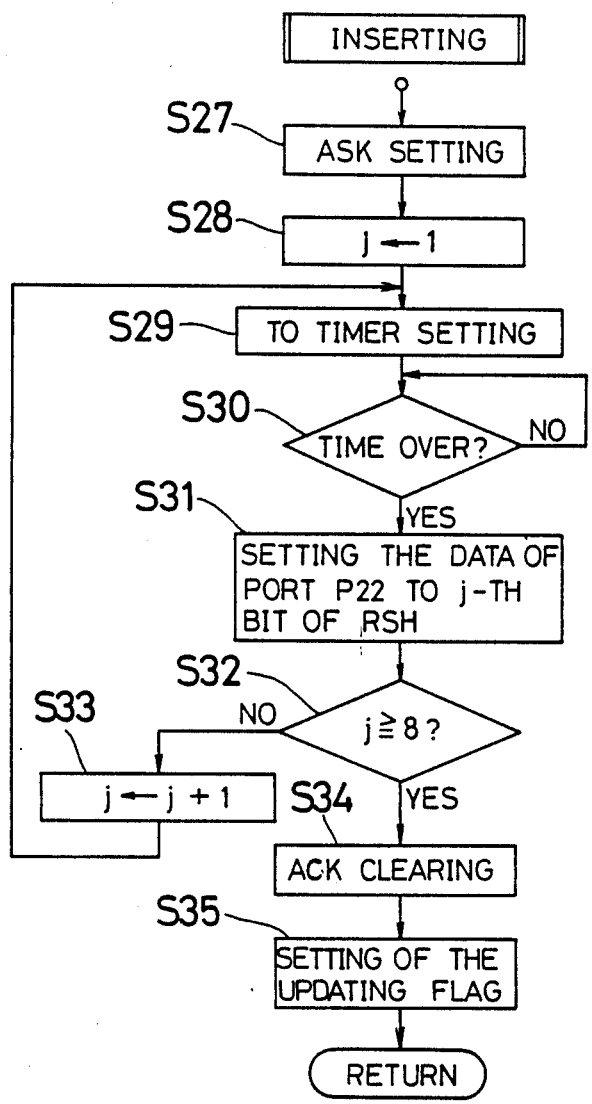

(2) When the transmission (signalled by interrupt) of the road surface detection data RCDb is presented from CPU 1, CPU 3 receives the data and writes it to the shift data register RSH (details are in FIG. 10B; because this is the same as the interrupt receiving process of CPU 2 shown in FIG. 8D, detailed explanation is omitted). Since this is executed every time the transmission is presented, up-to-date road surface detection data is always maintained in the shift register RSH.

Figure 11A:
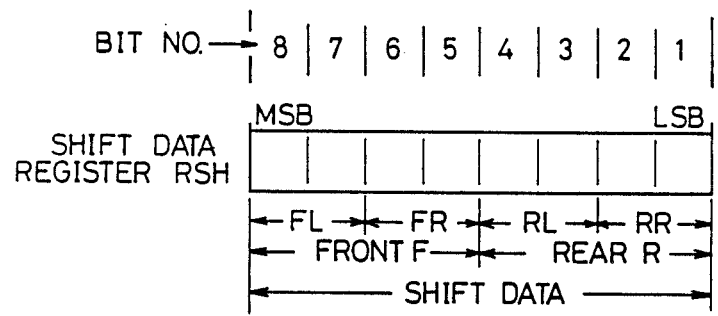
FIG. 11A is a plan view showing the structure of a register wherein CPU 3 writes the data received from CPU 1.
Figure 11B:
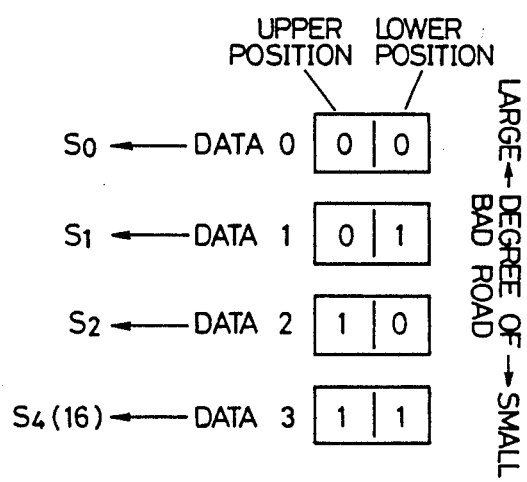
FIG. 11B is a plan view showing the content of data of 1 set that CPU 1 transmits to CPU 3.

Further, CPU 1, at said "road surface condition detecting" step (M6) (FIG. 7B), when transmitting the road surface condition detecting data RCDb to CPU 3, since said data is two bits as shown in FIG. 11B, transmits by writing in four sets of two bits each to a transmitting register of one byte. This transmitting register and the shift register RSH of CPU 3 are each 8-bit as shown in FIG. 11A, neighboring two bits of RCDb forming a set, and each set being assigned to car wheels FL, FR, RL and RR respectively. CPU 1 judges the driving condition (pitching and rolling) of the car from each detected value of the car level sensors and the detected value of the steering sensor 11E, changing or adjusting the respective shift data (RCDb) assigned to each of FL, FR, RL and RR of the transmitting register in response thereto, but when particular pitching or rolling is not detected in the straight-running condition, leaving the shift data (RCDb) assigned to each of FL, FR, RL and RR unchanged.

(3) Reading in of the car wheel speed (S3):

CPU 3 converts the analog signal of A/D converter input ports Afr, Afl, Arr and Arl to digital data sequentially, and writes the respective data to the car wheel speed registers Afr, Afl, Arr and Arl.

(4) Calculation of standard speed Vs (S6; details are in FIG. 10C):

CPU 3 proceeds by extracting the highest speed Vh of the car wheel speeds Afr, Afl, Arr and Arl, comparing this with the stored value Vs of the standard speed register Vs, and when Vh≧Vs, writing in Vh to the standard speed register Vs. When Vh<Vs (the content of the standard speed register Vs at this time is designated as Vso), counting of an elapsed time To from this point in time. So long as Vh<Vs and To is less than a predetermined value Tp at every iteration of newly reading the car wheel speed, the content of standard speed register Vs ss updated to $$Vso - K1 \cdot To.$$

and when To exceeds the predetermined value Tp (content of the standard register Vs of this time point is taken as Vs1), thereafter updating the content of the standard speed register to $$Vs1 - K2 \cdot (To - Tp).$$

When the highest value Vh of the car wheel speeds Afr, Afl, Arr and Arl exceeds the content Vs of the standard speed register Vs, Vh is written into the standard speed register Vs. According to this, the highest-value-of-speed curve shown in FIG. 12A (the solid line representing the car wheel speed Vfr of the front right car wheel, the dotted line representing the highest value Vh of the car wheel speed of all four wheels, and the one dot chain line representing the calculation value calculated assuming decreasing pressure with predetermined decreasing speed K1, K2) is written to the standard speed register Vs. This is the standard speed that is considered as the car speed.

(5) Calculation of the car wheel acceleration (S7-S14):

The car wheel acceleration dVfr of the front right car wheel is obtained by subtracting the contents RVfr of the car wheel speed register RVfr last written at the previous read-in of car wheel speed from the presently read-in car wheel speed Vfr, and writing the result to the acceleration register dVfr (S7). Since the calculation of the car wheel acceleration is executed during a 5 microsecond period according to the 5 microsecond timing loop of steps S4 and S5, the subtracted value represents the speed changing amount (acceleration) during 5 microseconds; when the subtracted value is plus, it represents positive acceleration and when it is minus, negative acceleration. When terminating this calculation, the read-in car wheel speed Vfr of this time is written to the car wheel register RVfr in place of the last value (S8).

The calculations of acceleration of front left car wheel FL, rear right car wheel RR and rear left car wheel RL are executed similarly (S9-S14).

(6) Anti-skid brake pressure (ASB) control (S15-S18: details are in FIG. 10D):

Explaining with regard to the front right car wheel, first it is judged whether or not ASB control, which begins by decreasing brake pressure, is necessary. To do this, the slipping rate Sfr of car wheel FR is calculated as $$Sfr = 1 - Vfr/Vs,$$

and it is judged whether Sfr and the acceleration dVfr are included within the slant lined region of FIG. 12 (ASB control starting region). When road conditions change from, for example RCDb=3=good road, to 2=a rather bad road, 1=bad road, and 0=worst road, the lower limit value of the ASB control starting region is successively raised to S2, S1, and S0.

When conditions are within the ASB control starting region, 1 is written to Ffr. Next it is judged whether Sfr and acceleration dVfr are included within the slant line region of FIG. 12C (pressure decreasing region, the lower limit of which likewise changes with road conditions) or within the other region (pressure duty increasing region). When conditions are included within the pressure decreasing region, the duration Tdec of remaining in that region is counted. When the judgment that conditions are included within the pressure decreasing region switches to the judgment that they are included within the pressure duty increasing region, the duty DPf of a flash pressure increasing interval is determined and written into the duty register RDU. (As described hereinafter, one period of duty control is 40 microseconds, DPf is a value representing the proportion of pressure increasing time during said period.) When setting the first increased pressure duty cycle after entering ASB control, DPf is made the duty value by adding an increment a for flash operation to a standard duty value DPs, but when setting the next increased pressure duty cycle after a second interval of pressure decrease (the second pressure duty increasing interval in the sequence pressure decreasing—pressure duty increasing—pressure decreasing—pressure duty increasing . . . . ), DPf is set to the highest (last) duty of the pressure duty increasing interval of last time. From the setting of the duty cycle of the flash pressure increasing interval, after A×5 microseconds, the initial value of the increased pressure duty cycle is obtained and written into the duty register RDU. This initial value is made the standard value DPs in the first pressure duty increasing interval. The initial value of the increased pressure duty cycle from the second interval on is calculated as DPs+PA+PB. In this expression, PA is an initial value adjusting amount corresponding to the execution period number Pn (since one period is 40 microseconds, a time of Pn×40 microseconds) of the last pressure duty increasing interval, determined by the relation shown in FIG. 12E in response to Pn, and is written to the internal memory of CPU 3. PB is an initial value adjusting amount corresponding to the duration Tdec of the pressure decrease immediately preceding, and is determined by the relation shown in FIG. 12F in response to Tdec, and written to the internal memory of CPU 3.

When either the duration of the pressure duty increasing interval becomes 1 second or Vs becomes less than 7 km/h, the flag register Ffr is cleared, terminating ASB control. Following writing to the flag register Ffr, judging whether the relation between the slipping rate Sfr and car wheel acceleration dVfr falls within either the decreasing region or the duty increasing region of FIG. 12C, executing the setting of the aforementioned increasing/decreasing pressure, and the like are performed.

ASB control with regard to the other car wheels is the same as aforementioned.

(7) Output control (S19-S22):

Explaining with respect to the first electromagnetic switch valve 33 which determines the brake pressure of the car wheel brake $36_2$ of front right car wheel FR, when the ASB control determination is "no" during (6) above, "0" is output to the output port SL 3, placing the third electromagnetic switch valve 33 in a "pressure increasing" connection state shown in FIG. 5.

When the ASB control determination is "yes", 1 is output to the output port SL 3 when in the decreasing pressure region, energizing the third electromagnetic switch valve to the state connecting the car wheel brake $36_2$ to the low pressure output port (reservoir 50) of the pump 48. When in the pressure duty increasing region, during the time interval from the end of the immediately preceding pressure decrease to the elapse of A×5 microseconds (flash pressure increasing period), the switch valve is controlled to realize a duty cycle of "RDU/40" by outputting "0" (increasing pressure) to the output port SL 3 during an interval RDU microseconds (DPf microseconds during the flash pressure increasing interval) of the duty register RDU, and outputting 1 (decreasing pressure) to the output port SL 3 during the next (40−RDU) microseconds. At the first period after exceeding A×5 microseconds, the duty is changed to the duty determined by the value RDU microseconds of the duty register RDU (the interval of DPs microseconds or "DPs+PA+PB" microseconds), that period lasting 40 microseconds with increasing pressure initially, followed by decreased pressure during the remainder of the period. At the second period the duty is made one step higher, taking the initial value+2 microseconds as the duration of increasing pressure and the remaining section as decreasing pressure, again taking one period to be 40 microseconds; and at the third period similarly executing output control to SL 3 (outout 0 : increasing pressure, output 1 : decreasing pressure) and having the increasing pressure period 2 microseconds longer (duty one step higher) than the period immediately before. According to this arrangement, the duty is varied as shown at the lowest column in FIG. 12A, and the car wheel brake pressure is varied as shown at the second column from the bottom of FIG. 12A.

Figure 12A:
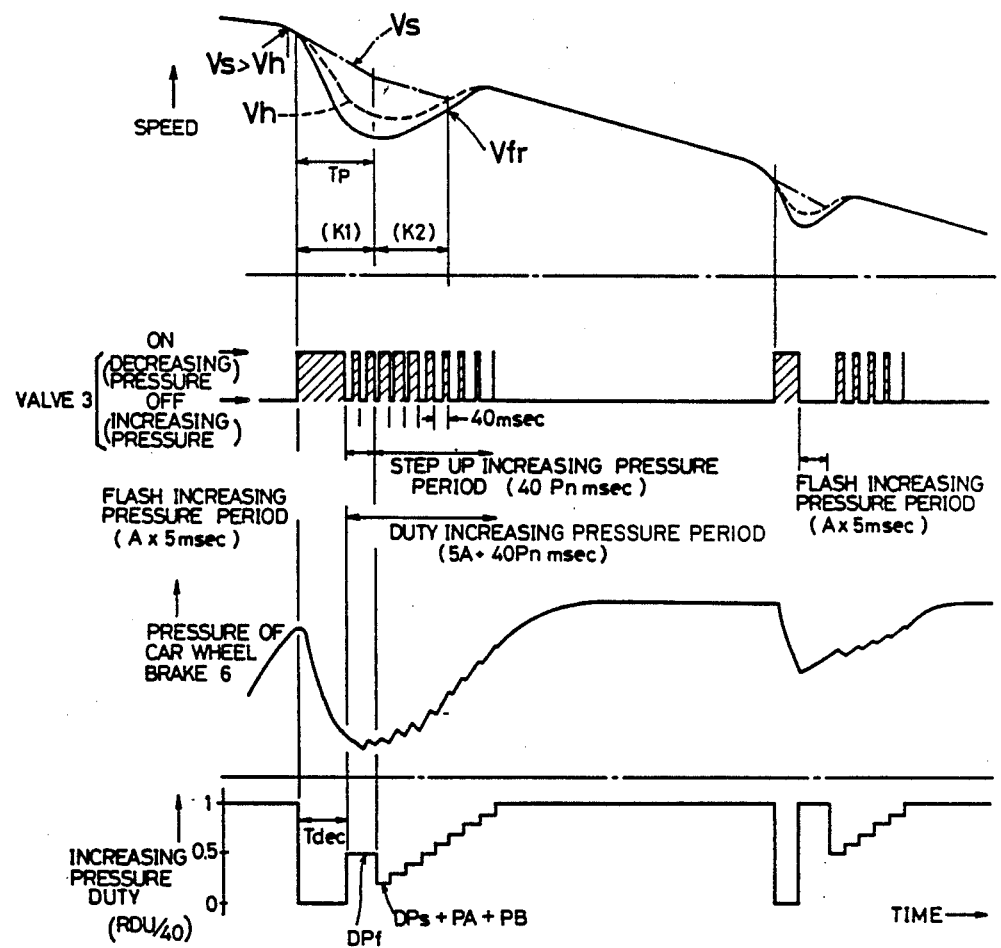
FIG. 12A is a time chart showing the relations of car wheel speed, standard speed coming from calculation under control of CPU 3, car wheel brake pressure, ON/OFF of electromagnetic switching valve 33 and duty value.
Figure 12B:
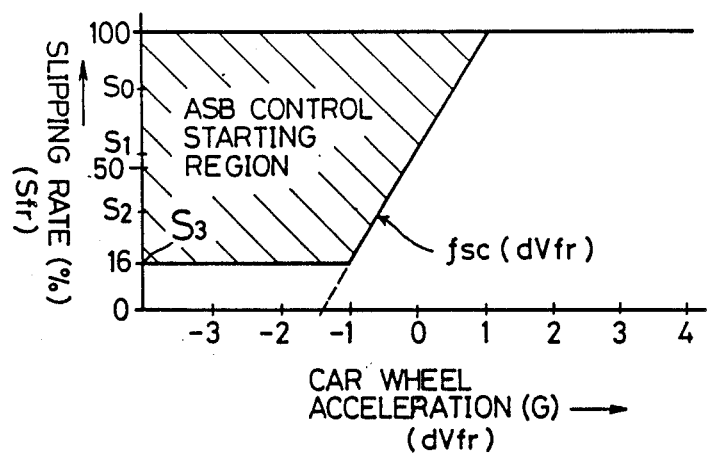
FIG. 12B is a graph showing a relation of the slipping rate and acceleration of the car wheel, and anti-skid brake pressure control region.
Figure 12C:
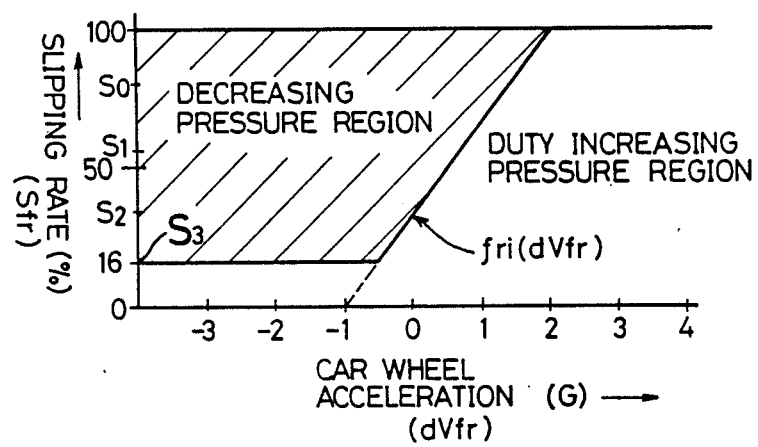
FIG. 12C is a graph showing a relation of the slipping rate and acceleration of the car wheel, and pressure decreasing region and duty pressure increasing region.
Figure 12D:
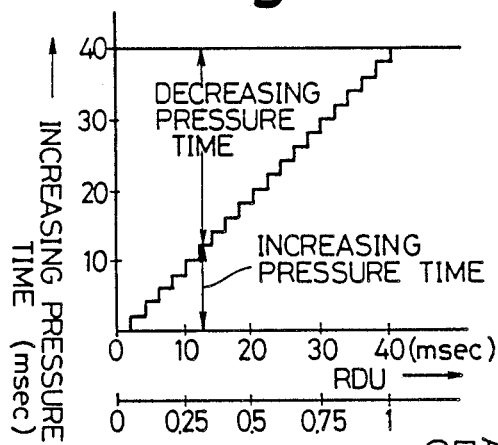
FIG. 12D is a graph showing a relation between the duty value and pressure increasing time in brake pressure duty control.
Figure 12E:
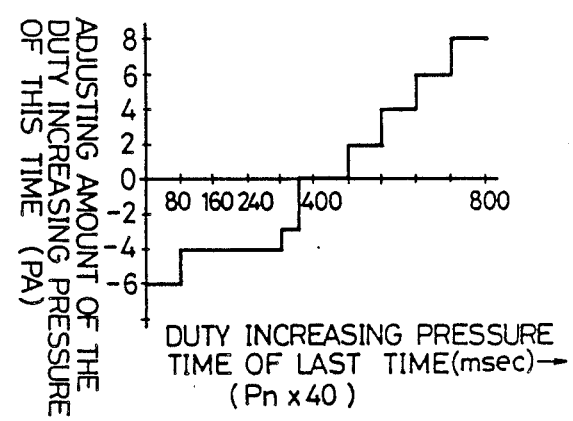
FIG. 12E is a graph showing a relation between the duty pressure increasing time of a previous time and an adjusting amount of an initial value of duty pressure increase of a present time.
Figure 12F:
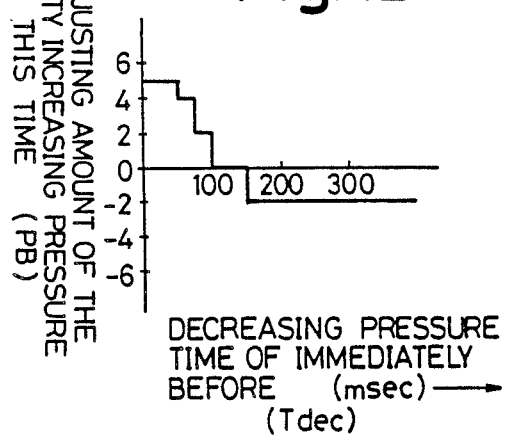
FIG. 12F is a graph showing a relation between the pressure decrease holding time immediately before the duty pressure increasing and the adjusting amount of an initial value of duty pressure increasing.

The relation between the duty value in the aforementioned duty control and the increasing pressure time and decreasing pressure time of one period (40 microsec) is shown in FIG. 12D. Further, as the limiting duty cycles 1 and 0 are encountered at the extremes of the graph, the pressure itself may be increased or decreased, respectively.

The control of the second through fourth electromagnetic switch valves 33A, 34 and 34A for determining the brake pressure of the car wheel brake $36_1$ of front left car wheel FL, the car wheel brake $36_4$ of rear right car wheel RR and the car wheel brake $36_3$ of rear left car wheel RL is also similar with the control of aforementioned first electromagnetic switch valve 33.

(8) Pump control (S23–S28):

During (6) above, when it is determined that the slipping rate and the acceleration with respect to each of the car wheels fall within the slant lined region (ASB control region) of FIG. 12B, this is represented by writing 1 into the flag registers Ffr, Ffl, Frr and Frl corresponding to the car wheels, ASB control is started, and when either the duration of the pressure duty increasing interval becomes 1 sec, or Vs falls below 7 khm/h during ASB control, a 0 is written into said flag register (register clearing).

In executing pump control, when 1 is written into at least one of the flag registers Ffr, Ffl, Frr and Frl, 1 is latched to the output port MD for instructing the activation of motor 19, and when the contents of all flag registers Ffr, Ffl, Frr and Frl are 0, a 0 for instructing the cessation of motor 19 is output to the output port MD. Accordingly, the motor 49 is energized during ASB control (pressure decreasing or pressure duty increasing) being executed with respect to at least one car wheel, and the pumps 48, 48A are driven.

Figure 10C:
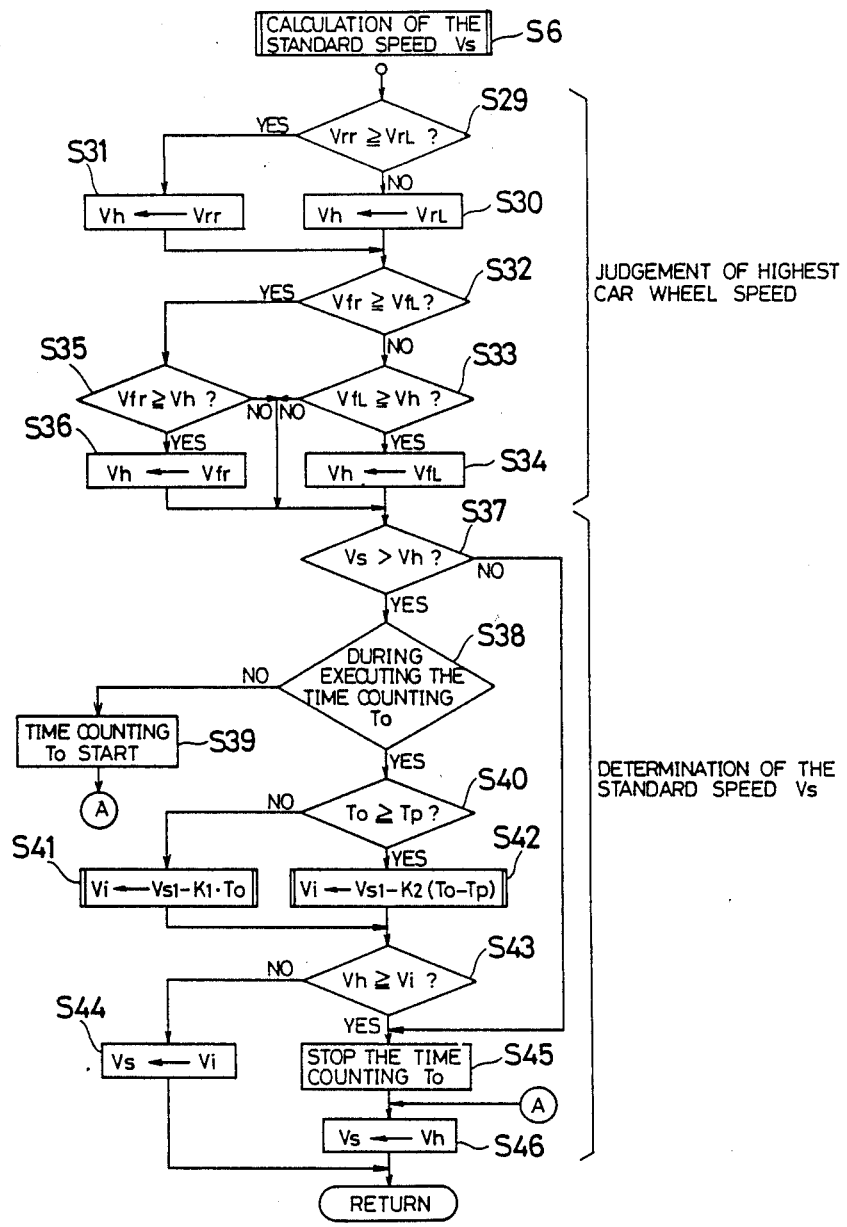

Next, the of the calculation (S6) of the aforementioned standard speed will be described in greater detail with reference to FIG. 10C hereinafter.

Since the calculation (S6) of this standard speed Vs is executed in connection with the 5 msec timer operation of steps S4 and S5 (FIG. 10A), it is executed at 5 msec intervals. When proceeding to the calculation (S6) of the standard speed, CPU3 first compares the car wheel speeds Vfr and Vfl of the front wheels, and writes the greater of the two to the register Vh (S29–S31). And then, comparing the car wheel speeds Vrr and Vrl of the rear wheels, choosing the greater, and comparing this with the value of register Vh, writing the greater to the register Vh (S32–S36), the highest of just-read car wheel speeds is written to the register Vh. Next, CPU 3 compares the content Vs of the standard register Vs with the content Vh of the Register Vh, and when Vh≧Vs, writes Vh to the register Vs (S37, S46).

When Vh becomes less than Vs, Vs is written to the register Vso at that time and the time To is started counting (S38, S39), and while continuing counting, it is judged whether or not the counting time value To has equalled the predetermined value Tp, and when To is less than Tp, Vi=Vso−K1·To is calculated and written into the register Vi. Vi is then compared with Vh, and when Vi>Vh, Vi is written to the standard speed register Vs (S40–S41–S43–S44). When To becomes equal to Tp, Vs is written to the register Vsi at that time, and thereafter, Vi=Vsi−K2·(To−Tp) is calculated and written into the register Vi. Vi is then compared with Vh, and when Vi>Vh, Vi is written to the standard speed register Vs (S40–S42–S43–S44). In any case, when Vi≦Vh, the timer To is stopped, and Vh is written to the standard speed register Vs (S43–S45–S46).

According to above description, the value written into the standard speed register Vs is the greater value among the values calculated of the decreasing car wheel highest speed value Vh shown by the dotted line and the predetermined decreasing speed (k1, k2) shown by the one-dot chainline in FIG. 12A. The constants k1, k2 correspond to upper limit safety value of the allowable speed decrease without car wheel lockup occurring.

Figure 10D:
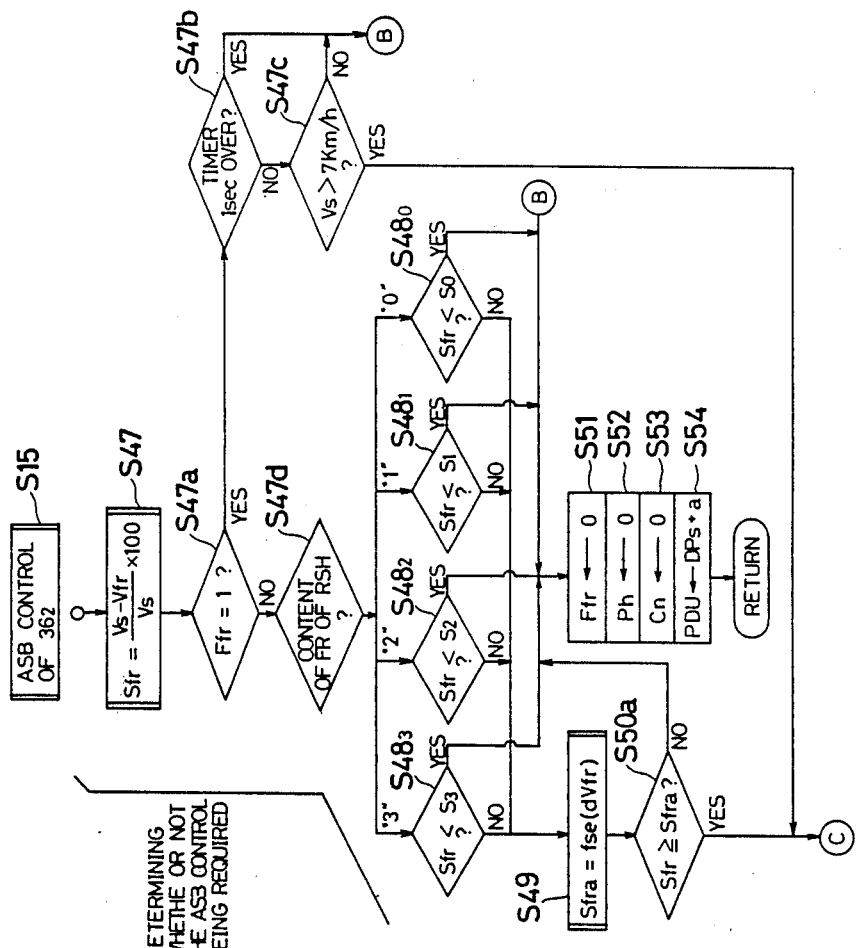

Next, the details of the content of ASB control (S15) of the brake $36_2$ of front fight car wheel FR will be explained with reference to FIG. 10D hereinafter.

Figure 10E:
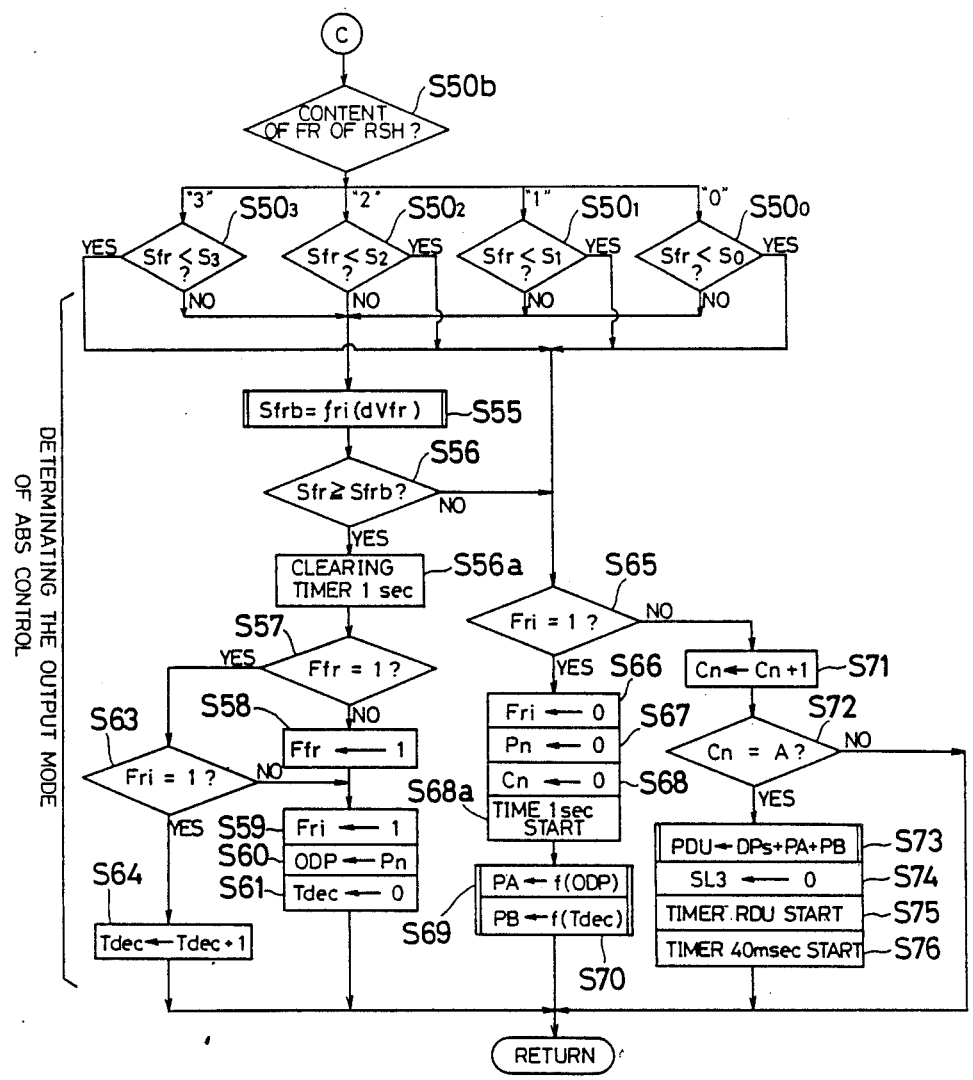

When proceeding to ASB control (S15), CPU 3 first calculates the slipping rate Sfr (S47), checks the content of the flag register Ffr (S47a), and when it is 0 (ASB control is not started yet), judges whether or not the relation between the slipping rate Sfr and the acceleration dVfr is included in the ASB control starting region shown in FIG. 12B (S47d, S48$_0$–S48$_3$, S49, S50a). In this case, first the shift data FR for the car wheel FR (the content of FR of the shift data register RSH in FIG. 11A) is tested (S47d), and when it is 3 (good road), the lower limit value of the ASB control starting region is set to S$_3$ when it is 2 (a rather bad road), the lower limit value of the ASB control starting region is set to S2, when it is 1 (bad road), the lower limit value of the ASB control starting region is set to S1, and when it is 0 (worst road), the lower limit
value of the ASB control starting region is set to S$_0$ (S$_3$–S$_0$ are illustrated in FIG. 12B). Since the area under said setting value of the slipping rate Sfr (%) is not within said starting region, CPU 3 first checks whether or not Sfr is over the setting value, then substitutes the present speed dVfr into the function S=f se(d Vfr) representing the border line of the ASB starting region and terminating region, calculating the corresponding slipping rate $$Sfra = f se\ (d\ Vfr)$$

on the border line (S49), and checking whether or not the present slipping rate Sfr exceeds Sfra (is within the ASB control starting region; S50a). Next, when it is judged to be within the ASB control starting region, CPU 3 proceeds to the setting of the brake pressure control mode of FIG. 10E. When judging that it is outside of the ASB control starting region (within the ASB control terminating region), CPU 3 clears the contents of the Ffr, Pn and Cn registers for use during the brake pressure control mode hereinafter described (S51–S53), and writes in the duty of the first occurring flash pressure increasing interval (more precisely, the increasing pressure time within one period) of ASB control, which may perhaps be started thereafter, to the duty register RDU (S54). This is the setting of the standard value of the first-time flash pressure increasing interval.

Meanwhile, when judging that conditions are within the ASB control starting region, CPU 2 first checks whether or not Sfr exceeds Sfra as aforementioned (S50b, S50$_3$–S50$_0$), and when it does judges whether the relation between the present slipping rate Sfr and the present acceleration dVfr is included within the decreasing region shown in FIG. 12C, or, by the same logic, is included within the duty increasing region and executes the decreasing pressure setting of steps S57–S64, or when judging that conditions are within the pressure increasing region, executes the pressure duty increasing setting of steps S65–S76.

At first, when starting from the judgment that conditions are within the ASB control starting region and then deciding that they are within the decreasing pressure region CPU 3 starts the 1 sec timer for observing the duration of the pressure duty increasing interval (S56a), writes in 1 to the flag register Ffr (S57–S58), writes 1 to the register Fri for indicting the execution of pressure decreasing (S59), writes the number of periods Pn of the last pressure duty increasing interval (0 at step S52 at the time of the first pressure decreasing interval after entering the ASB control starting region, but in the case of the second and succeeding pressure decreasing intervals, the number of periods of the immediately preceding pressure duty increasing interval) to the register ODP (S60), and clears the decreasing pressure time register Rdec (S61).

Thereafter, the measurement (S64) of the duration of the first pressure decreasing interval through steps S57–S63–S64 is executed until the duration of the pressure duty increasing interval during ASB control becomes 1 sec or Vs falls below 7 km/h.

Next, when the slipping rate Sfr and the car wheel acceleration dVfr enter the pressure duty increasing region shown in FIG. 12C, since the content of the flag register Ffi is 1 indicating the opposite region, this is cleared (S65, S66), the register Pn for counting the number of periods of the pressure duty increasing interval is cleared (S66), the register Cn for counting iterations of the flash pressure increasing interval is cleared (S68), the 1 sec timer for observing the duration of the pressure duty increasing interval is started (S68a), and the adjustment values PA and PB of the initial pressure duty value are calculated (S69, S70 ; since it is the first pressure duty increasing interval, the content of the register OPD is 0 (S52, S60), and Tdec is the duration of the immediately preceding first-time pressure decreasing interval). The adjustment is executed by reading out the adjusting value PA corresponding to the contents of the register OPD (FIG. 12E) and the adjusting value PB corresponding to the register Tdec (FIG. 12F) from the memory, and writing them to the register PA and the register PB, respectively.

When the next determination also indicates a pressure duty increasing interval, CPU 3 proceeds to steps S56–S65–S71, incrementing by 1 the contents of the register Cn and checking whether or not the content Cn of the register Cn has become A (duration of the flash pressure increasing interval has reached a predetermined time; S72). If not, the steps S56–S65–S71–S72-return are repeated until the predetermined time has elapsed. When the predetermined time has elapsed, DPs+PA+PB is written to the duty register RDU. That is to say, though the content of the duty register RCU was the duty of the flash pressure increasing interval (the value representing the increasing pressure time of the 40 msec) until this time, since the flash period pressure increasing time (A×5m sec) has elapsed, the content of the duty register RDU is updated to the initial value for the duty pressure increasing interval (S73). DPs is the standard initial duty value of the flash pressure increasing interval, PA is the adjusting value corresponding to the number of periods of the last pressure duty increasing interval (in case of the first duty pressure increasing interval, it is 0), PB is the adjusting value corresponding to the duration Tdec of the immediately preceding pressure decreasing interval. When updating is completed, CPU 3 outputs 0 (increasing pressure) to the output port SL3 (S74), starts the timer RDU looking for lapse of the time that the content of the duty register RDU represents (S75), and starts the 40 msec timer looking for lapse of the time period of 40 msec (S76).

Further, after starting the first duty pressure increasing interval like this, CPU 3 terminates it and then, when executing the second pressure decreasing interval, leaves as it is the content of the duty register RDU (this is the final highest duty which has been increased by 2 msec at every lapse of 1 period by the hereinafter described output (S19) to SL3 during the pressure duty increasing interval). Since the number of periods Pn of the immediately preceding duty increasing interval is written to the register OPD (S60), in the flash pressure increasing interval immediately preceding the second pressure increasing interval, the duty is taken to be the last duty of the first pressure duty increasing interval and PA for the initial value of the second pressure duty increasing interval becomes the adjusting quantity shown in FIG. 12E (determined by number of periods Pn of the first pressure duty increasing interval×40).

Since the content of the flag register Ffr has become 1 after starting ASB control, CPU 3 calculates the slipping rate Sfr at every 5 msec interval subsequent to initiation of ASB control (S15), and subsequently proceeds from step S47 to S47b, S47c and judges whether or not the ASB control terminating condition is satisfied, and when it is satisfied, executes the terminating process of ASB control in steps S51–S54. When the terminating condition is not satisfied, CPU 3 proceeds to steps S47–S47a–S47b–S47c–S50a, judging whether the relation between the slipping rate Sfr and the car wheel acceleration dVfr fall within either of the decreasing region and the pressure duty increasing region, and executes the setting of ASB control corresponding to the judging result.

Figure 10F:
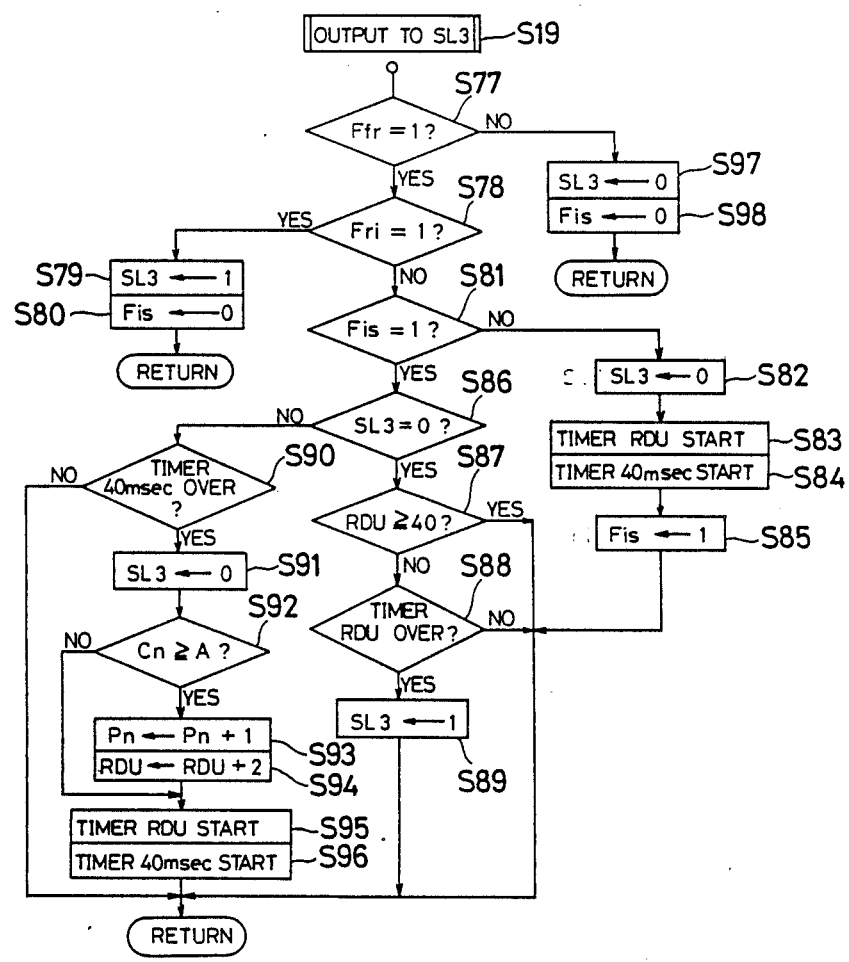

Next, the content of the output to SL 3 will be explained in detail with reference to FIG. 10F hereinafter. Here, in order to facilitate understanding, it will be assumed that the rotational condition of the car wheel FR (slipping rate Sfr and car wheel acceleration dVfr) is transferred starting ASB control, beginning with a first pressure decreasing interval followed by a first pressure duty increasing interval, a second pressure decreasing interval, and a second pressure duty increasing interval, followed by terminating ASB control.

At first, when ASB control begins (first pressure decreasing interval), the content of the flag register Ffr has become 1 (S58) by ASB control of wheel 36₂ (S15), the flag register Ffi also has become 1 (S59), the content of the register OPD is Pn=0 (S52, S60), the content of the register Tdec also is 0 (S61), and the content of the duty register RDU is DPs+a (S54). Thereafter, CPU 3 outputs 1 (S79 decreasing pressure) to the output port SL 3 at the output step (S19) to SL3, and writes in 0 (during decreasing pressure) to the flag register Fis (S80). Even if the judgment (FIG. 10D) of ASB control (S15) of 36₂ is left as it is, during output (S19) to SL3 the next time, only the steps S79 and S80 are executed. During this time, the duration Tdec of the first pressure decreasing internal is measured in the ASB control (S15) of 36₂ (S56–S57–S63–S64).

When the judgment of ASB control (S15) of 36₂ (FIG. 10D) is changed from "pressure decreasing" to the "pressure duty increasing", steps S65–S66–S68–S60–S70 are executed in ASB control (S15) of 36₂, and at the output (S19) to SL3, CPU 3 first proceeds through steps S787–S78–S80–S82, outputting 0 (increasing pressure) to the output port SL3 (S82), starting the timer RDU (containing a limit value of Dps+a; S83), starting the 40 msec timer (S84), and writing in 1 (during the pressure duty increasing interval) to the flag register Fis (S85). According to this procedure, the first flash pressure increasing interval is started. Thereafter, CPU 3 checks for the time-out condition of the timer RDU at steps S77–S78–S81–S86–S87, and when it has timed-out, outputs 1 (decreasing pressure) to the output port SL3. Further, when the content of RDU is over 40 msec, since this implies continuous increasing pressure, in that case, increasing pressure is maintained (SL3=0) without checking for the time-out of the timer RDU. Hereinafter, the explanation will be continued assuming that RDU is under 40 msec.

Meanwhile, when the timer RDU has timed-out, CPU 3 outputs 1 (decreasing pressure) to the output port SL3, and at this time, proceeds through steps S86–S90, checking whether or not the 40 msec timer has timed-out, and when it has timed-out (signalling the end of one period), outputting 0 (increasing pressure) to the outport SL3 (S91), and checking whether or not the content of the register Cn has become A (S92). When it has not become A, CPU 3 restarts the timer RDU (S95), restarts the 40 msec timer (S96), and executes flash pressure increasing during the next period. During this execution sequence, during ASB control (S15) of 6, the content of the register Cn is incremented every 5 msec. And when Cn becomes A (5A msec has elapsed from the start of the flash pressure increasing interval), during ASB control (S15) of 36₂, the first pressure duty increasing interval is started (S71–S76). According to this procedure, the content of the duty register RDU is updated to DPs+Pa (20)+PB, i.e., it is updated to the initial value of the first pressure duty increasing interval, the output to SL3 having become 0 (increasing pressure).

CPU 3, at the output step (S19) to SL3, executes the steps S77–S78–S81–S87–S88, waiting for timer RDU to time out, and when the time is over, outputs 1 (decreasing pressure) to the output port SL3, and next, waits for the 40 msec timer to time out in steps S77–S78–S81–S86–S90, and when has timed out (first period of first pressure duty increasing interval), since Cn exceeds A, at this time CPU 3 increments (S93) the register Pn (initially 0; step S67), increments the duty register RDU, extending the increasing pressure period by 2m sec (S94), starts the timer RDU for determining the increasing pressure section of the next period, and starts the 40 msec timer for determining the end of the next period (S96). Then, steps S77–S81–S87–S88 are executed. By so doing, while the pressure duty increasing interval continues, the increasing pressure section is repeatedly extended by 2 msec from its initial value at every time period elapsed during the first duty pressure increasing interval.

When the judgment of ASB control (S15) of 36₂ switches to decreasing pressure (second pressure decreasing interval), in the course of steps S57–S63–S59–S60–S61 of ASB control (S15) of 36₂, 1 (decreasing pressure) is written to the flag register Fri, the content (number of periods of the first time pressure duty increasing interval) of the register Pn at that time is written to the register OPD, and the register Tdec is cleared. In response to this, at the output step (S19) to SL3, CPU 3 outputs 1 (decreasing pressure) to the output port SL3 by steps S77–S78–S79–S80, making the content of the register Fis 0 (decreasing pressure; starting of second pressure decreasing interval). The duration of the second pressure decreasing interval is measured at step S64 of ASB control (S15) of 36₂.

When the judgment of ASB control (S15) of 36₂ switches from decreasing pressure (second time) to pressure duty increasing (second time), the initial value adjusting quantity PA (FIG. 12E) corresponding to the period number of the first duty pressure increasing interval is written to the register PA, and the initial value adjusting quantity PB (FIG. 12F) corresponding to the Tdec of the second pressure decreasing interval is written to the register PB. Further, the content of the duty register RDU represents the increasing pressure time of the last period of the first pressure duty increasing interval.

At the output step (S19) to SL3, PPU 3 first executes the steps S77–S78–S81–S82–S85, and starts the first pressure increase period of the second flash pressure increasing interval, and thereafter executes control the same as the control of the aforementioned first flash pressure increasing interval and first pressure duty increasing interval. However, the duty of the second flash pressure increasing interval (increasing pressure portion of one 40 msec period) becomes the duty of the last period of the first pressure duty increasing interval, and the initial value of second pressure duty increasing interval becomes DPs (standard value)+PA (adjusting quantity corresponding to the period number Pn of the first pressure duty increasing interval)+PB (adjusting quantity corresponding to the duration Tdec of the second pressure decreasing interval).

When the end of ASB control is judged at ASB control step (S15) of 36₂, in the following steps S51–S54, the flag register Ffr is cleared, the registers Pn, Cn are cleared, and DPs+a is written to the duty register RDU. At the output step (S19) to SL3, CPU 3 executes the steps S77–S97–S98 in outputting 0 (increasing pressure) to the output port SL 3, and clearing the flag register Fis.

Next, the anti-skid control based on the road surface condition detection and the detection data of the aforementioned embodiment will be explained and summarized. The car wheel speed sensor 42 fr generates the signal (car wheel speed signal) representing the car wheel speed, and F/V converter 53 converts this to an analog voltage. Differentiating circuit 54 generates the signal representing the changing rate of this analog voltage (car wheel speed signal), and the absolute value circuit 55 generates the signal representing the absolute value of the signal representing the changing rate. The signal representing the absolute value of the signal representing the changing rate is integrated in the integrating circuit 56, and CPU 1 reads in by digital conversion the integrated voltage level. CPU 1 executes this reading-in at intervals of Tsa, detecting the range of the read-in level data, writing in the data representing this (0 : worst road, 1 : bad road, 2 : a rather bad road, 3 : good road) to the register RCDa, comparing this with the last read-in value (content of the register RCDa), and when they are different, writing the present read-in value RCDa to the register RCDb, and transmitting it to CPU 3 as a shift instruction data.

Further, CPU 1 judges the driving condition of the car on the basis of the detected value of other sensors, and when change or adjustment of this shift instruction data is required, CPU 1 executes this for each car wheels, writing the data (2 bits each) for each car wheel to an 8-bit register, and transmitting this quantity (8 bits) to CPU 3. CPU 3 writes in the received data (8 bits) to the shift data register RSH shown in FIG. 11A.

CPU 3, when it has not yet started anti-skid control, refers to the shift instruction data RCD 6 for each car wheel, and sets the comparing reference value (target slipping rate) for determining whether or not to increase pressure to the low value S3 when the road surface condition is good (RCDb=3), to a rather high value S2 when the road surface condition is rather bad (RCDb=2), to a high value S when the road surface condition is bad (RCDb=1) and to highest value $S_0$ when the road surface condition is worst (RCDb=0), and when the slipping rate of each car wheel has exceeded this setting value, starts (beginning with a pressure decrease) anti-skid control, during which when the slipping rate of each car wheel is over said setting value pressure is decreased, and when it comes within some range under the setting value, increasing pressure duty, and when it comes within some terminating range, terminating anti-skid control (setting the usual continuous increasing pressure mode).

Further, in this embodiment explained above, in processing the detection pulse of the car wheel speed sensor 42fr at F/V converter—integrating circuit 56, CPU 1 reads in the integrated voltage by digital conversion and detects the range of integrated voltage and prepares the data (0–3) representing it, transmitting this to CPU 3 for anti-skid control; however, since CPU 3 also detects the changing rate of the car wheel speed (S7–S14 of FIG. 10A labelled calculation of car wheel acceleration), CPU 3 could always keep the absolute value of this acceleration for the past few times, judging its mean value or adding the values themselves (technically the same as integration anyway), and this result may be used as a setting parameter for performing pressure decreasing and increasing decisions during anti-skid control, or for changing and adjusting. Thus, the transmission of the shift data from CPU 1 t CPU 3 becomes unnecessary.

As shown in FIG. 7C, since the integrated value is changed in response to the good/bad condition of the road surface condition, and this integrated value can be clearly discriminated over three regions, state detection correlated relatively closely with the good/bad condition of the road surface in multiple detection regions becomes possible.

Therefore, as shown in FIGS. 7D–7G, in order to perform effective braking in view of the concavity and convexity of the road surface, it is desirable to set the slipping rate for starting pressure decreasing to be higher as the road surface condition is worse, and when the comparative reference value defining the pressure decreasing starting region is established in multiple steps such as $S_3$–$S_0$ in response to the road surface condition, even if the accuracy of the road surface condition detection is low, since the anti-skid control characteristic is not radically changed in spite of slight differences in the road surface condition, (for example, as in conventional binary control), anti-skid control that is high in safety and reliability can be realized.

As described above, according to the road surface condition detecting device of the present invention, road condition represented by concave/convex variations in the road surface can be more correctly detected than with conventional devices. Therefore, reliability of anti-skid control using the detected data of this detecting device as one of the control parameter is improved. Particularly, since said detecting device is capable of detecting the road surface condition in multiple steps, on the basis of one of the parameter for determining anti-skid control, pertinent brake pressure control in response to the road surface condition can be executed. In this case, despite slight differences in the road surface condition, since the anti-skid control characteristic is not radically changed, anti-skid control that is high in safety and reliability can be realized.

What is claimed is:

1. A road surface condition detecting device in a car comprising:
   car wheel rotational speed detecting means for detecting the rotational speed of a car wheel of said car;
   changing rate detecting means for detecting a speed changing rate of the car wheel rotational speed detected with said car wheel rotational speed detecting means;
   integrating means for integrating an absolute value of the speed changing rate detected with said changing rate detecting means; and
   comparing means for comparing an integrated value from said integrating means with a set value for road surface condition judgment to thereby detect a road surface condition.

2. A road surface condition detecting device in a car comprising:
   car wheel rotational speed detecting means for detecting rotational speed of a car wheel of said car;
   changing rate detecting means for detecting a speed changing rate of the car wheel rotational speed detected with said car wheel rotational speed detecting means;
   integrating means for integrating an absolute value of the speed changing rate detected with said changing rate detecting means;
   car speed detecting means for detecting car speed;
   speed comparing means for comparing said car wheel rotation speed with said car speed;

judgment comparing means for comparing an integrated value of said integrating means with a set value for road surface condition judgment to thereby detect a road surface condition; and memory means for storing judgment information of said judgment comparing means at a time when said speed comparing means detects that said car wheel rotational speed is within a range of being substantially equal to said car speed.

3. Anti-skid control device comprising:

a brake pressure source for generating a high pressure and a low pressure;

valve means which is interposed between said brake pressure source and a car wheel brake, for connecting a liquid flow path between said car wheel brake and said high pressure and low pressure of said brake pressure source;

car wheel rotation speed detecting means for detecting rotational speed of a car wheel equipped with said car wheel brake;

calculating means for calculating car speed on the basis of said car wheel rotation speed;

means for calculating a speed changing rate of said car wheel rotation speed;

integrating means for integrating an absolute value of the speed changing rate;

comparing means for comparing an integrated value of said integrating means with a set value for road surface condition judgment; and brake pressure control means for controlling low pressure/high pressure connection of said car wheel brake by driving said valve means in response to a compared result of said car wheel rotation speed and said car speed and said comparing means.

* * * * *